(12) United States Patent
Tamai et al.

(10) Patent No.: US 8,025,770 B2
(45) Date of Patent: Sep. 27, 2011

(54) USED PAPER PROCESSING APPARATUS

(75) Inventors: Shigeru Tamai, Osaka (JP); Yuji Koyama, Osaka (JP)

(73) Assignee: Seed Company Limited, Osaka (JP)

( * ) Notice: Subject to any disclaimer, the term of this patent is extended or adjusted under 35 U.S.C. 154(b) by 578 days.

(21) Appl. No.: 11/485,309

(22) Filed: Jul. 13, 2006

(65) Prior Publication Data

US 2007/0017649 A1    Jan. 25, 2007

(30) Foreign Application Priority Data

Jul. 20, 2005  (JP) ................. 2005-210440

(51) Int. Cl.
*D21F 9/02*    (2006.01)
(52) U.S. Cl. ........ 162/348; 162/261; 162/336; 162/344; 162/359.1
(58) Field of Classification Search .............. 162/4, 336, 162/344, 261, 348, 359.1; 34/111
See application file for complete search history.

(56) References Cited

U.S. PATENT DOCUMENTS

| | | | | |
|---|---|---|---|---|
| 1,954,284 | A * | 4/1934 | Davies | 162/205 |
| 2,148,613 | A * | 2/1939 | Frost | 162/336 |
| 3,357,880 | A * | 12/1967 | Curtis | 162/344 |
| 4,141,388 | A * | 2/1979 | Romanski et al. | 139/383 AA |
| 2002/0152630 | A1 * | 10/2002 | Lindsay et al. | 34/111 |
| 2007/0006987 | A1 * | 1/2007 | Brambilla | 162/264 |
| 2007/0113994 | A1 * | 5/2007 | Ogunjimi | 162/19 |

FOREIGN PATENT DOCUMENTS

| | | |
|---|---|---|
| JP | 62-42752 | 2/1987 |
| JP | 6-134331 | 5/1994 |
| WO | WO 2005 054570 A1 * | 6/2005 |

OTHER PUBLICATIONS

Smook, Handbook for Pulp and Paper Technologists, 1992, Angus Wilde Publications, 2nd edition, pp. 207-208, 228-282.*
Smook, Handbook for Pulp and Paper Technologists, 1992, Angus Wilde Publications, 2nd edition, chapters 13, 16, 17, 23, and 24.*
Can-am Machinery, The Story of the Eagle Paper Machine [downlaoded online from www.canammachinery.com], downloaded on Jul. 20, 2009, whole document.*

* cited by examiner

*Primary Examiner* — Matthew Daniels
*Assistant Examiner* — Anthony Calandra
(74) *Attorney, Agent, or Firm* — Cheng Law Group, PLLC

(57) ABSTRACT

A used paper processing apparatus to be place in small shop or general household, capable of holding high secrecy, friendly to the environment, and low in running cost. In a furniture size apparatus case, a pulp manufacturing section for manufacturing used paper pulp by macerating and beating the used paper, a paper making section for manufacturing recycled paper by making the used paper pulp manufactured in the pulp manufacturing section, and a control section for driving and controlling by interlocking the pulp manufacturing section and paper making section are provided, being place in a room producing used paper, and by macerating and processing the used paper by the pulp manufacturing section, leak or disclosure of confidential information or private information written or printed on used paper can be prevented effectively, and further used paper pulp is processed by the paper making section, and recycled paper is manufactured.

39 Claims, 10 Drawing Sheets

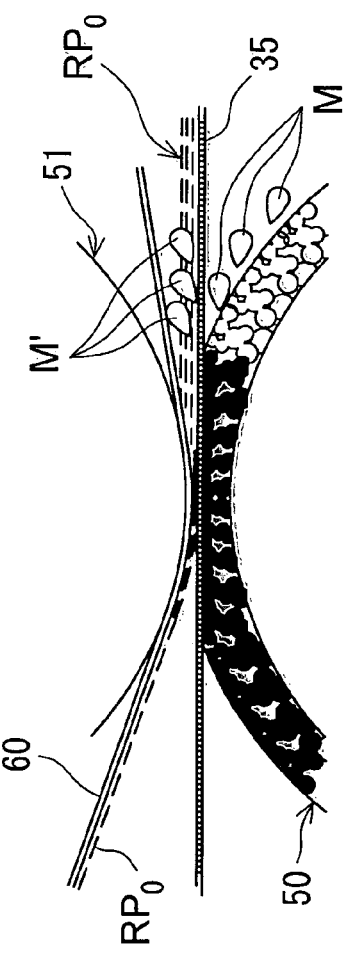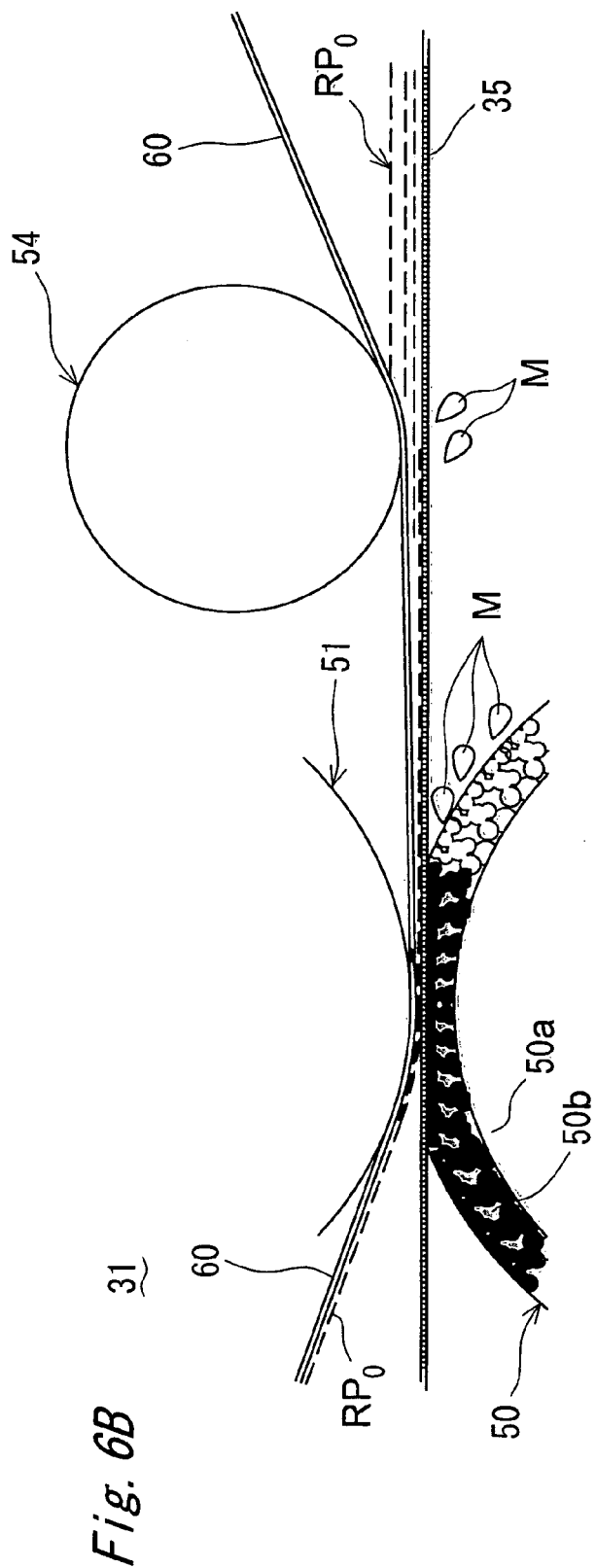

USED PAPER PROCESSING APPARATUS

BACKGROUND OF THE INVENTION

1. Field of the Invention

The invention relates to a used paper processing apparatus, and more particularly to a used paper processing technique for processing used documents and used paper such as confidential papers from government authorities and private enterprises and private letters and used paper from general household, while effectively preventing leak or disclosure of confidential information and personal information printed or written on the paper documents.

2. Description of the Related Art

In routine works at public offices and private companies, various documents containing confidential information such as company information including customer information, personal information, project schemes, etc., and plans, designs, diagrams and so on are used and managed, and in daily household life, letters and postcards bearing address, personal name and other private information, electricity and gas meter bills and other personal papers are handled, and after use, these documents are discarded as used paper.

In our modern electronic society promoted by information technology, it is essential to prevent leak and disclosure of confidential information written in used paper such as company information including customer information, design drawings, etc., and private information including personal names and addresses, etc., and preventive measures and technology are being developed intensively for this purpose.

Among them, the shredder is used widely both in offices and general household, as indispensable means for preventing leak of confidential information and important personal information. The shredder has a mechanism of cutting used paper to be put into the discard into small pieces (see, for example, Japanese Patent Application Laid-Open No. 62-42752), and characters and diagrams printed or written in used paper can be shredded into illegible small pieces, and leak or disclosure of confidential information or important private information composed of characters and diagrams can be prevented effectively.

On the other hand, a surprising technical progress makes it possible to restore the original documents from shredded paper pieces, and reproduce and collect the printed confidential information. It is now proved that the reliability of shredder so far believed to prevent leak of confidential information is not perfect.

Besides, since the shredder is intended to protect the confidential information, the shredded paper pieces must be discarded.

In addition to the conventional shredder for cutting used paper into small pieces, a wet process shredder is developed for tearing used paper into small pieces while adding a small amount of water (see, for example, Japanese Patent Application Laid-Open No. 6-134331), torn chips of used paper processed by this shredder are sent to a paper recycling plant, and used as material for recycled paper.

Torn chips by wet process shredder are pulp, not in the form of paper, and original documents will not be restored as in the case of cut chips from conventional shredder, and confidential information can be protected.

However, the wet process shredder is very bulky as compared with ordinary shredder, and requires a large space for installation, and its use is limited only to a huge office producing a huge volume of used paper, and it is not suited to small office, shop or general household not having enough space for installation or limited in the output of used paper. If the torn chips are used as material for recycle paper, paper can be processed only in a large plant, and the paper processing cost is high, and it is not economical.

SUMMARY OF THE INVENTION

It is hence a primary object of the invention to present a novel used paper processing apparatus capable of solving the problems of the prior art.

It is other object of the invention to present a used paper processing apparatus to be place not only in a large office but also in small shop or general household, capable of securely preventing leak or disclosure of various information such as confidential information, personal information and so on, keeping high level of secrecy, friendly to the environment, and low in running cost.

A used paper processing apparatus in a first aspect of the invention is an apparatus placed in a place of origin of used paper, for preventing leak or disclosure of confidential information or personal information contained in the paper by macerating the used paper, comprising a pulp manufacturing section for manufacturing used paper pulp by macerating and beating the used paper, a paper making section for manufacturing recycled paper by making the used paper pulp manufactured in the pulp manufacturing section, and a control section for driving and controlling by interlocking the pulp manufacturing section and paper making section, which are contained in a furniture size apparatus case.

"Beating" herein means operation for fibrillating pulp fiber by beating or grinding to control length of the pulp.

Preferred embodiments are composed as follows.

(1) The water used in the pulp manufacturing section is wastewater from the paper making section recirculated by water circulation system.

(2) The drive source of pulp manufacturing section and paper making section is a motor drive source driven by alternating-current power source for general household.

(3) The apparatus case has moving means, so as to be movable on the floor of installation.

(4) The pulp manufacturing section includes agitating means for agitating used paper, and water feed means for supplying water to the agitating means, and macerated used paper supplied from a supply opening of the apparatus case is agitated in water, and further macerated and beaten (or refined).

(5) In (4), the agitating means has an inlet of used paper, and also includes an agitation tank storing water supplied from the water feed means, agitating blades provided rotatably in the agitation tank, and a drive motor for rotating and driving the agitating blades.

(6) In (5), a shredder is provided in the inlet of the agitation tank, and the used paper supplied in the opening is preliminarily cut by the shredder, and is further agitated by the agitating blades.

(7) In (4), the water feed means includes a white water recovery tank for collecting white water filtered and dehydrated in the paper making section, and a water feed pump for supplying the water in the white water recovery tank to the agitating means of pulp manufacturing section.

(8) In (5), the pulp manufacturing section has pulp concentration adjusting means disposed at the downstream side of the agitation tank for adjusting the concentration of the used paper pulp manufactured in the agitation tank, and this pulp concentration adjusting means includes a concentration adjusting tank storing the used paper pulp manufactured in the agitation tank, and water feed means for adjusting concentration for supplying water into the concentration adjusting tank, and the concentration of used paper pulp manufactured in the agitation tank is adjusted by addition of water from the water feed means for adjusting concentration, and a pulp suspension of specified concentration is prepared.

(9) In (8), water is added from the water feed means for adjusting concentration to whole volume of used paper pulp manufactured in the agitation tank, and the concentration adjusting tank is composed to prepare the pulp suspension of specified concentration by the total volume of used paper pulp and water to a specified volume.

(10) In (8), the water feed means for supplying water to the agitating means also functions as water feed means for adjusting concentration.

(11) The paper making section includes a paper making net conveyor for making wet paper from pulp suspension slurry containing water and used paper pulp sent from the pulp manufacturing section, a drying belt conveyor for making recycled paper by drying the wet paper formed by the paper making net conveyor, and a dewatering roll for squeezing and dewatering the wet paper in a combined portion of paper making net conveyor and drying belt conveyor, and the pulp suspension supplied from the pulp manufacturing section is processed, dewatered and dried.

(12) In (11), the paper making net conveyor has a mesh endless belt having a specified width for processing and conveying the pulp suspension, a drive motor for driving the mesh endless belt, and a pulp feeder for supplying the pulp suspension from the pulp manufacturing section onto the mesh endless belt, and by this pulp feeder, the pulp suspension is spread and supplied uniformly on the upper surface of the mesh endless belt.

(13) In (12), in the pulp feeder, the mesh endless belt is disposed obliquely upward to the running direction, the pulp feeder has a partition member disposed slidably on the lower side of the mesh endless belt, and a deckle body disposed slidably on the upper side of the mesh endless belt, and the pulp suspension supplied in the deckle body is diffused uniformly on the upper side of the mesh endless belt by stagnant action by cooperation of deckle body and partition member, and is conveyed together with the mesh endless belt while keeping a width dimension specified by the deckle body by running action of mesh endless belt, and is dewatered by the own gravitational action by the mesh of the mesh endless belt.

(14) In (13), the partition member has a louver structure for slidably supporting the lower side of the mesh endless belt, and the flow-down supply portion of the pulp suspension at the base end side has a flat plate member for supporting the mesh of the mesh endless belt in closed state.

(15) In (14), an overflow tank is provided in the deckle body, and the pulp suspension supplied in the deckle body is once collected in the overflow tank, and overflows, and flows down onto the flat plate member of the partition member.

(16) In (12), a pulp supply tank storing the pulp suspension manufactured in the pulp manufacturing section is provided at the upstream side of the pulp feeder, and the pulp suspension in the pulp supply tank is continuously supplied into the deckle body of the pulp feeder by a suspension feed pump.

(17) In (11), the drying belt conveyor includes a smooth surface endless belt having a specified width for receiving and conveying the wet paper processed and formed in the paper making net conveyor, a drive motor for driving this smooth surface endless belt, and a heating dryer for heating an drying the wet paper on the smooth endless belt, and the wet paper squeezed and dewatered in the paper making net conveyor at downstream position of the dewatering roll is transferred adhered and conveyed to the lower side of the smooth surface endless belt by the smooth surface structure of the smooth surface endless belt.

(18) In (17), the heating dryer has a heater plate adjacent to an opposite side of holding surface of the wet paper on the smooth surface endless belt, and the wet paper on the smooth surface endless belt is heated and dried indirectly by the smooth surface endless belt heated by the heater plate.

(19) In (17), the heating dryer has a rotatable heater roll rolling on the wet paper on the smooth surface endless belt, and the wet paper on the smooth surface endless belt is heated and dried directly by the heater roll.

(20) In (17), the heating dryer has a hot air heater for blowing a hot air to the wet paper on the smooth surface endless belt, and the wet paper on the smooth surface endless belt is heated and dried directly by the hot air heater.

(21) In (17), the smooth surface endless belt is composed of a thermoplastic heat resistant material capable of withstanding heat of the heating dryer.

(22) In (21), the smooth surface endless belt is a fluoroplastic belt.

(23) In (21), the smooth surface endless belt is a steel belt.

(24) In (11), the dewatering roll squeezes and dewaters the wet paper on the mesh endless belt by pressing, rolling and squeezing the mesh endless belt of the paper making net conveyor and the smooth surface endless belt of the drying belt conveyor from the upper and lower sides.

(25) In (24), the dewatering roll has a dewatering roll rolling on the mesh endless belt from the lower side, a press roll for rolling and pressuring the smooth surface endless belt from the upper side on the dewatering roll, and a drive motor for rotating and driving these two rolls in cooperation, and by these two rolls the mesh endless belt and smooth surface endless belt are pressed, rolled and squeezed from upper and lower sides, and moisture contained in the wet paper on the mesh endless belt is absorbed on the dewatering roll by way of the mesh endless belt.

(26) In (25), the dewatering roll has a dewatering sheet made of porous material of fine continuous pores wound around the outer circumference of the cylindrical roll of high rigidity material.

(27) in (25), the press roll is a cylindrical press roll of high rigidity material.

(28) In (12), a preliminary dewatering roll rolling on the mesh endless belt from the lower side is disposed at the upstream side of the dewatering roll.

(29) In (28), the preliminary dewatering roll has a dewatering sheet made of porous material of fine continuous pores wound around the outer circumference of the cylindrical roll of high rigidity material.

(30) In (17), a slurry preventive roll for rolling and pressurizing the smooth surface endless belt from the upper side is disposed near the upstream side position of the dewatering roll.

(31) In (30), the slurry preventive roll is a cylindrical roll composed of high rigidity material.

(32) In (17), a smooth surface finishing roll for rolling and pressuring the wet paper on the smooth surface endless belt is disposed somewhere on the running route of smooth surface endless belt.

(33) In (17), a parting member for parting a dry paper dried on the smooth surface endless belt is disposed at the downstream side of the heating dryer in the smooth surface endless belt.

(34) In (33), a fixed size cutter for cutting the recycled paper parted from the smooth surface endless belt to a specified length is provided at the downstream side of the parting member.

(35) In (11), in the paper making section, the smooth surface endless belt of the downstream side drying belt conveyor and the mesh endless belt of upstream side paper making net conveyor are laminated and disposed vertically, and in the upper and lower adjacent portions of the smooth surface endless belt and mesh endless belt, the dewatering roll presses, rolls and squeezes the mesh endless belt and smooth surface endless belt from the upper and lower sides.

(36) In (35), the paper making net conveyor and drying belt conveyor are driven by a common drive source.

A used paper processing apparatus in a second aspect of the invention is placed in a place of origin of used paper, and comprises a pulp manufacturing section for manufacturing used paper pulp by macerating and beating the used paper, and a paper making section for manufacturing recycled paper by making the used paper pulp manufactured in the pulp manufacturing section, which are contained in a furniture size apparatus case, in which used paper is macerated and processed by the pulp manufacturing section into used paper pulp, the used paper pulp is processed by the paper making section into recycled paper, and thereby the used paper is recycled and used as recycled paper within the place of origin of used paper.

The invention brings about the following excellent effects, and it can be place not only in a large office, but also in a small shop or general household, and leak and disclosure of confidential information, personal information and other various private information can be securely prevented, and a high secrecy is maintained, and moreover a used paper processing apparatus friendly to the environment and low in running cost can be presented.

(1) Being installed or placed in a place of origin of used paper, used paper is macerated and beaten into used paper pulp by the pulp manufacturing section, and the used paper is decomposed into fiber level (as pulp), and the printed or written characters and diagrams are completely decomposed and eliminated, and cannot be restored. Hence leak and disclosure of confidential information, personal information and other various private information composed of characters and diagrams can be securely prevented, and a high secrecy is maintained.

(2) By the paper making section for processing the used paper pulp manufactured in the pulp manufacturing section and manufacturing recycled paper, used paper is not discarded, but can be recycled and used as recycled paper in the place of origin of used paper, and disposal of used paper is reduced, and refuse problems can be solved and limited resources can be utilized effectively.

Recycling of this kind of used paper is not promoted because of confidential problems, and by recycling in the place of origin of used paper, the effect of effective use of resources is evident.

(3) In a furniture size apparatus case, the pulp manufacturing section, paper making section, and control section for driving and controlling them in cooperation are contained, and the apparatus size is compact, and it can be installed or placed not only in a large office, but also in small shop or general household, and from this viewpoint, too, leak and disclosure of confidential information, personal information and other private information can be securely prevented.

Moreover, since the used paper recycling apparatus of compact size having same functions as huge paper manufacturing plant or used paper recycling plant is place in the place of origin of used paper, transportation cost or combustion cost of used paper disposal is not needed, and it is very economical.

(4) Water used in the pulp manufacturing section is wastewater dehydrated and recovered from the paper making section, recirculated by water circulation system, and/or the driving source of pulp manufacturing section and paper making section is supplied from general household power source, and it is friendly to the environment and low in running cost, and is hence economical.

(5) Being or installed or placed in a place of origin of used paper, the pulp manufacturing section macerates the used paper, and manufactures used paper pulp, and the paper making section processes the used paper pulp into recycled paper, and the used paper is recycled and used as recycled paper in the same place of origin of used paper, and information of characters and diagrams printed in the paper is not distributed out of the place of origin of used paper, and leak or disclosure of confidential information or private information can be prevented securely, and a high secrecy is maintained, while the resources can be utilized effectively.

That is, by using the used paper processing apparatus of the invention, diffusion of various information to outside of closed system of the place of use (such as school, hospital, city hall, patent attorneys' office, general household) can be securely prevented.

In other words, in the conventional shredder, if the used paper is cut into small pieces and the printed or written characters and diagrams are not legible, shredded pieces are transported and burnt in incinerator or the like, and diffused out of the closed system cannot be prevented completely. If stored in a warehouse to prevent diffusion, it is hard to keep storage capacity, and the resources cannot be used effectively if kept in storage.

By contrast, the used paper processing apparatus of the invention does not allow external diffusion of various information contained in the used paper, and can utilize the resources effectively.

These and others objects and features of the invention will be more clearly understood from the following description taken in conjunction with accompanying drawings and novel facts indicated in the claims attached to the end.

BRIEF DESCRIPTION OF THE DRAWING

FIG. 6A is a schematic diagram explaining a specific mechanism of squeezing and dewatering of dewatering roll in the paper making section, showing a basic squeezing and dewatering mechanism.

FIG. 6B is a schematic diagram explaining a specific mechanism of squeezing and dewatering of dewatering roll in the paper making section, showing a squeezing and dewatering mechanism when a slurry preventive roll is installed near the upstream side of dewatering roll.

DETAILED DESCRIPTION OF THE PREFERRED EMBODIMENT

Figure 1:
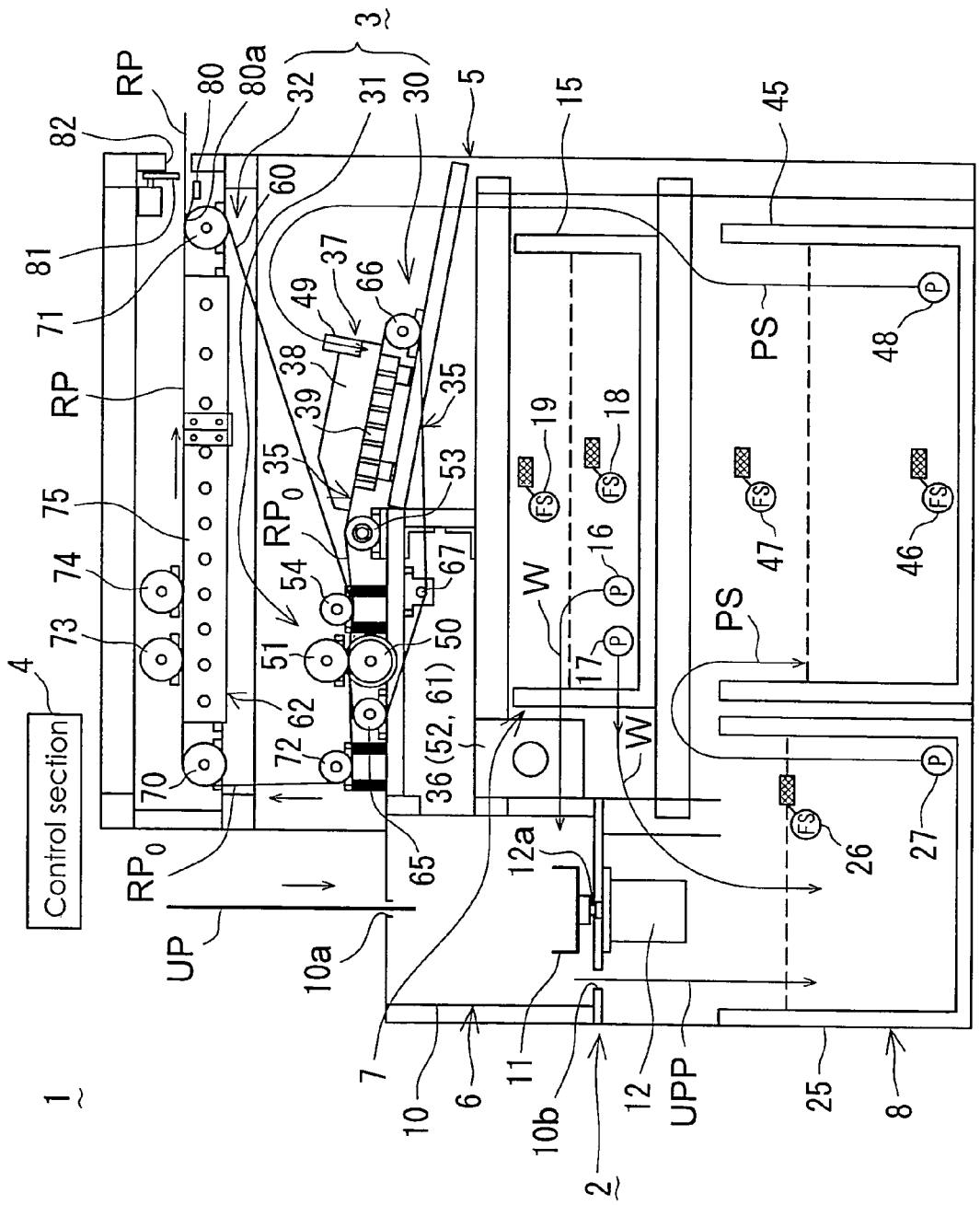
FIG. 1 is a front view of the outline of used paper processing apparatus in preferred embodiment 1 of the invention, shown by cutting open the apparatus case.

Referring now to the drawings, preferred embodiments of the invention are described specifically below.

FIG. 1 to FIG. 10 show the used paper processing apparatus of the invention, and same reference numerals throughout the drawings indicate same or similar constituent members or elements.

Preferred Embodiment 1

A used paper processing apparatus of the invention is shown in FIG. 1 to FIG. 6, and this used paper processing apparatus 1 is specifically place in a place of origin of used paper, and by macerating and processing the used paper UP, the apparatus is intended to prevent leak or disclosure confidential information or personal information contained in the used paper UP, and such used paper UP includes confidential documents of public and private offices, personal documents at general household, and other used and unnecessary documents.

As shown in FIG. 1, the used paper processing apparatus 1 mainly comprises a pulp manufacturing section 2, a paper making section 3, and a control section 4, and these components 2 to 4 are contained in a compact apparatus case 5, and the driving source of the pulp manufacturing section 2 and paper making section 3 is a power drive source driven by an alternating-current power source for general household. The individual components are specifically described below.

I. Apparatus Case 5:

The apparatus case 5 is as small as a piece of furniture place in an office, such as document rack, locker, desk, copier, or personal computer, and specific size and shape are properly designed according to purpose and application. As shown in the drawing, the apparatus case 5 is a box similar to shape and size of a copier.

II. Pulp Manufacturing Section 2:

The pulp manufacturing section 2 is a process unit for macerating and bearing (or refining) used paper UP and manufacture used paper pulp, and includes an agitating device (agitating means) 6 for agitating used paper UP, and a water feeder (water feeding means) 7 for supplying water to the agitating device 6.

The agitating device 6 has an agitation tank 10, agitating blades 11, and a drive motor 12.

The agitation tank 10 has an inlet 10a in its ceiling wall to be opened and closed to outside of the apparatus case 5, and the agitating blades 11 are disposed rotatably in its inside (in the bottom in the drawing).

Inner volume of agitation tank 10 is determined according to the number of sheets of used paper UP to be agitated and processed in batch. In the shown preferred embodiment, the agitation tank 10 is shown to have a volume for agitating and processing about 8 sheets (about 32 g) of used paper UP for A4 size PPC (plain paper copier) in batch by adding about 3 liters of water.

The agitating blades 11 are driven by a direct motor mounted and fixed directly in horizontal state on a rotary shaft 12a of drive motor 12, and are driven by the drive motor 12 to rotate normally and reversely. The drive motor 12 is specifically an electric motor electrically connected to the control section 4.

The agitating blades 11 rotate normally and reversely in order to prevent entangling of paper on agitating blades 11 when used paper UP of A4 size is directly agitated, and entangling is released by the action of jet flow of water by reverse rotation after normal rotation.

In this relation, the shape of blades of agitating blades 11 is designed to differ in the agitating force (diffusion effect) between normal rotation and reverse rotation, so that used papers UP, UP, . . . are macerated and beaten (or refined) uniformly.

Switching timing of normal rotation and reverse rotation of agitating blades 11, agitating time, and other operating conditions are determined so as to obtain desired macerating and beating (or refining) effects of used papers UP, UP, . . . on the basis of the data of preliminary experiments.

The water feeder 7 has a white water recovery tank 15 and a water feed pump 16. The white water recovery tank 15 collects, as described below, white water W (pulp water of ultralow concentration filtered by paper making mesh in paper making process) filtered and dehydrated in the paper making section 3, and the white water W collected in the white water recovery tank 15 is supplied by the water feed pump 16 as water for agitation in the agitation tank 10 in the agitating device 6.

The water feeder 7 also functions as water feeder for concentration adjustment (water feeding means for adjusting concentration) of the pulp concentration adjusting unit 8 as mentioned below, and for this purpose it has a water feed pump 17 for adjusting concentration for supplying the white water W of white water recovery tank 15 into the concentration adjusting tank 25 as water for adjusting concentration. Reference numerals 18 and 19 are lower limit level float switch and upper limit level float switch provided in the white water recovery tank 15.

In the agitating device 6, used papers UP, UP, . . . charged into the agitation tank 10 from the feed opening or the inlet 10a of the apparatus case 5 are agitated by normal rotation and reverse rotation of agitating blades 11 by the drive motor 12, for a specified time (3 to 5 minutes in the shown case) in the water W supplied from the water feeder 7, and are macerated and beaten to be used paper pulp UPP.

The pulp concentration adjusting unit 8 is provided at the downstream side of the agitation tank 10, and adjusts the concentration of used paper pulp UPP manufactured in the agitation tank 10 to an appropriate concentration suited to the consequent paper making process. The pulp concentration adjusting unit 8 includes a concentration adjusting tank 25 for storing the used paper pulp UPP manufactured in the agitation tank 10, and a water feeder for concentration adjustment (water feeding means for adjusting concentration) for supplying water into the concentration adjusting tank 25, and the water feeder for concentration adjustment is realized by, as mentioned above, the water feeder 7.

Inner volume of concentration adjusting tank 25 is determined according to the number of sheets (quantity) of used paper UP processed in batch in the agitating device 6. In the shown preferred embodiment, as mentioned above, about 8 sheets (about 32 g) of A4 size used paper UP are processed in batch, the concentration adjusting tank 25 has enough volume for adjusting the concentration of the corresponding amount of used paper pulp UPP.

In this relation, a drain port 10b is provided in the bottom of the agitation tank 10 of the agitating device 6, and the drain port 10b is opened or closed by a drain valve not shown. The drain valve is specifically an electromagnetic valve, which is electrically connected to the control section 4.

In a specific concentration adjusting method of pulp concentration adjusting unit 8, water W is added from the water feeder for concentration adjustment 7 to the whole volume of used paper pulp UPP manufactured in batch process in the agitation tank 10, and when the total volume of used paper pulp UPP and water W becomes a specified value, the pulp suspension PS reaches a specified concentration. The target concentration to be adjusted of the pulp suspension PS is predetermined in consideration of the paper making capacity of the paper making section 3 described below on the basis of results of preliminary experiments. In the shown example, it is set at concentration of about 0.1%. Reference numeral 26 is a float switch provided in the concentration adjusting tank 25, and it detects the water level when the amount of pulp suspension PS in the concentration adjusting tank 25 (total volume of used paper pulp UPP and water W) becomes the specified value.

In the concentration adjusting tank 25, the whole volume of used paper pulp UPP manufactured in the agitation tank 10 is dropped and supplied into the concentration adjusting tank 25 by gravity from the drain port 10b of the agitation tank 10, and from the water feeder for concentration adjustment 7, white water W is added to the used paper pulp UPP until reaching the specified value (detected by the float switch 26), and the concentration of the used paper pulp UPP is adjusted, and pulp suspension PS of specified concentration is prepared. In the shown preferred embodiment, in the whole volume of used paper pulp UPP (about 32 g of used paper UP+3 liters of water W), water W for diluting is added from the water feeder for concentration adjustment 7, and it is controlled so that the total volume (whole volume) of used paper pulp UPP and water W may be 30 liters, and pulp suspension PS of about 0.1% concentration (target concentration) is prepared. This pulp suspension PS adjusted in concentration is transferred to the paper making section 3 in next process by a first suspension feed pump 27.

While the used paper pulp UPP is dropped and supplied into the concentration adjusting tank 25 from the drain port 10b of the agitation tank 10, in the agitation tank 10, water W is supplied from the water feeder 7 by the water feed pump 16, and the agitating blades 11 are rotated by the drive motor 12, and the inside of the agitation tank 10 is cleaned.

Thus, the feed water source of the water feeder 7 is the white water W de dehydrated by the paper making unit 3 collected in the white water recovery tank 15, and in other words, the white water W dehydrated and collected in the paper making section 3 is recirculated and used in the agitating device 6 and pulp concentration adjusting unit 8 of the pulp manufacturing section 2 by water circulation system.

III. Paper Making Section 3:

The paper making section 3 is a process unit for manufacturing recycled paper by processing the used paper pulp manufactured in the pulp manufacturing section 2, and includes a paper making net conveyor 30, a dewatering roll section 31, and a drying belt conveyor 32.

The paper making net conveyor 30 is a unit for making wet paper from slurry pulp suspension PS containing water W and used paper pulp UPP sent from the pulp manufacturing section 2, and includes a mesh endless belt 35, a drive motor 36, and a pulp feeder 37.

The mesh endless belt 35 conveys the pulp suspension PS while processing, and more specifically it is an endless belt formed by connecting plate members of mesh structure of specified width in an annular form of specified length. The specified width is set slightly larger than the width of recycled paper RP to be manufactured from the pulp suspension PS. Plate members of mesh structure are materials capable of properly filtering and dehydrating pulp suspension PS by numerous mesh cells of the mesh structure, and are preferably composed of corrosion resistant materials including polypropylene (PP), polyethylene terephthalate (PET), polyamide (PA) (generally called "nylon"), and stainless steel (SUS), and a PET mesh endless belt 35 is used in the shown preferred embodiment. The specified length is a sufficient length for processing the pulp suspension PS into a proper weight in relation to the running speed of mesh endless belt 35, and is set in a size enough to be contained in a containing space of the paper making net conveyor 30 in the apparatus case 5.

Figure 2:
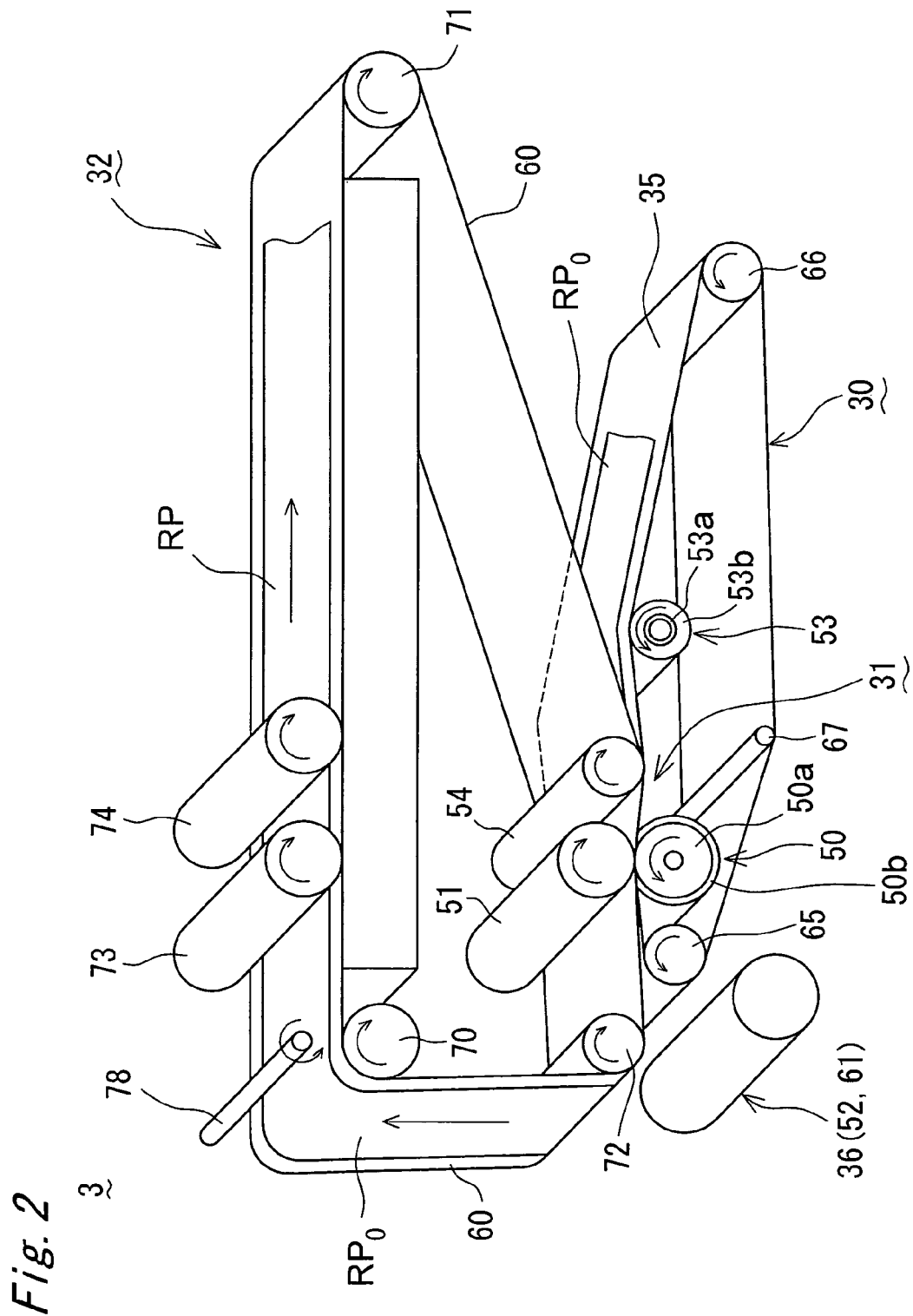
FIG. 2 is a perspective view of paper making section of the used paper processing apparatus.

The mesh endless belt 35 is rotatably suspended and supported by way of driving roller 65, driven roller 66, support roller 67, dewatering roll 50, and preliminary dewatering roll 53 as shown in FIG. 1 and FIG. 2, and is driven and coupled to the drive motor 36 through the driving roller 65.

The drive motor 36 for moving and driving the mesh endless bet 35 is specifically an electric motor, and is electrically connected to the control section 4. This drive motor 36 is also used commonly as running and driving source of dewatering roll section 31 and drying belt conveyor 32 mentioned below, and the common structure or driving coupling mechanism is described below.

The pulp feeder 37 is a unit for supplying pulp suspension PS from the pulp manufacturing section 2 onto the mesh endless belt 35, and specifically by this pulp feeder 37, the pulp suspension PS is uniformly spread and supplied on the upper side of the mesh endless belt 35.

Figure 4:
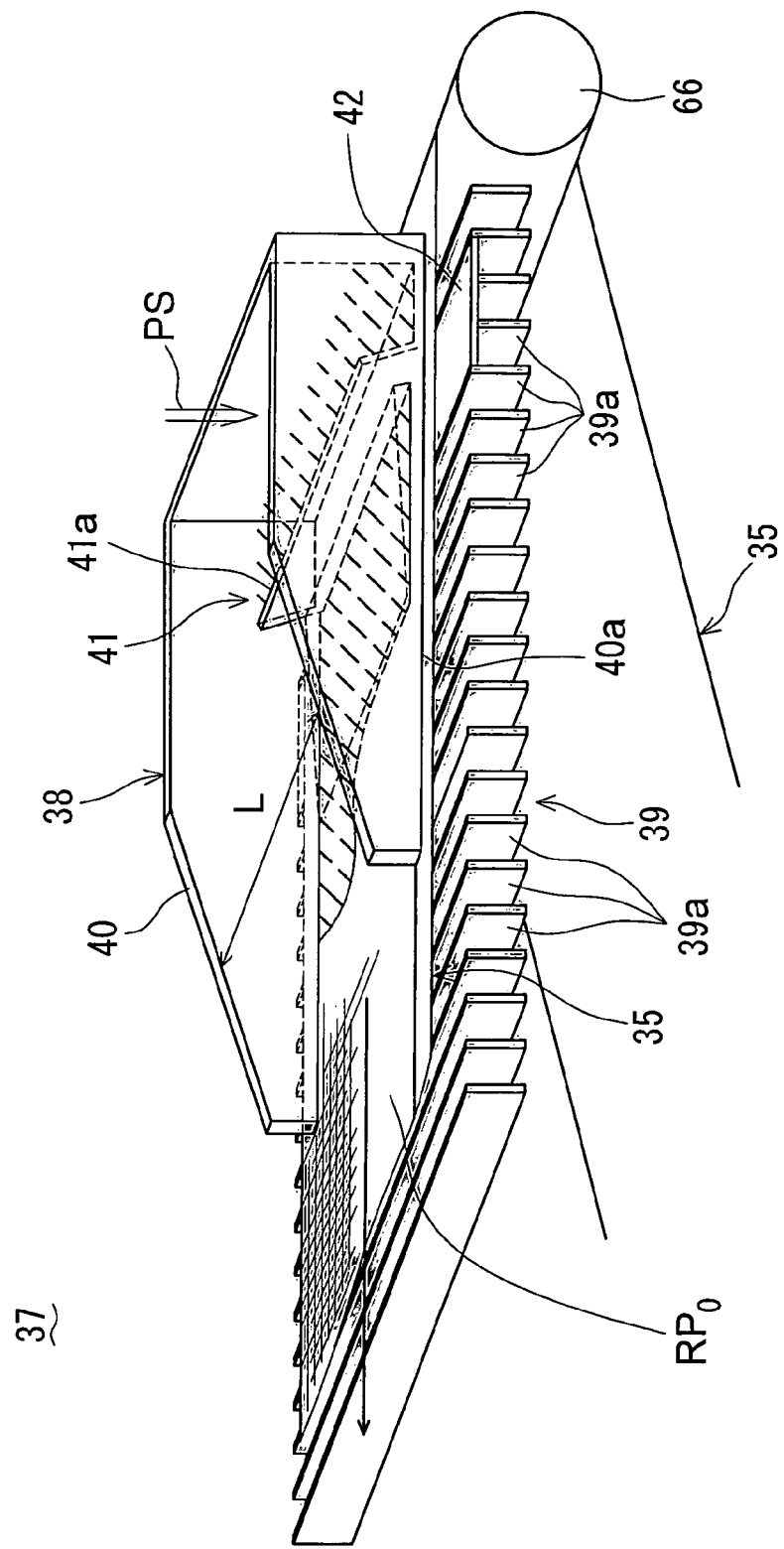
FIG. 4 is a magnified perspective view of pulp feeder of the paper making section.
Figure 5:
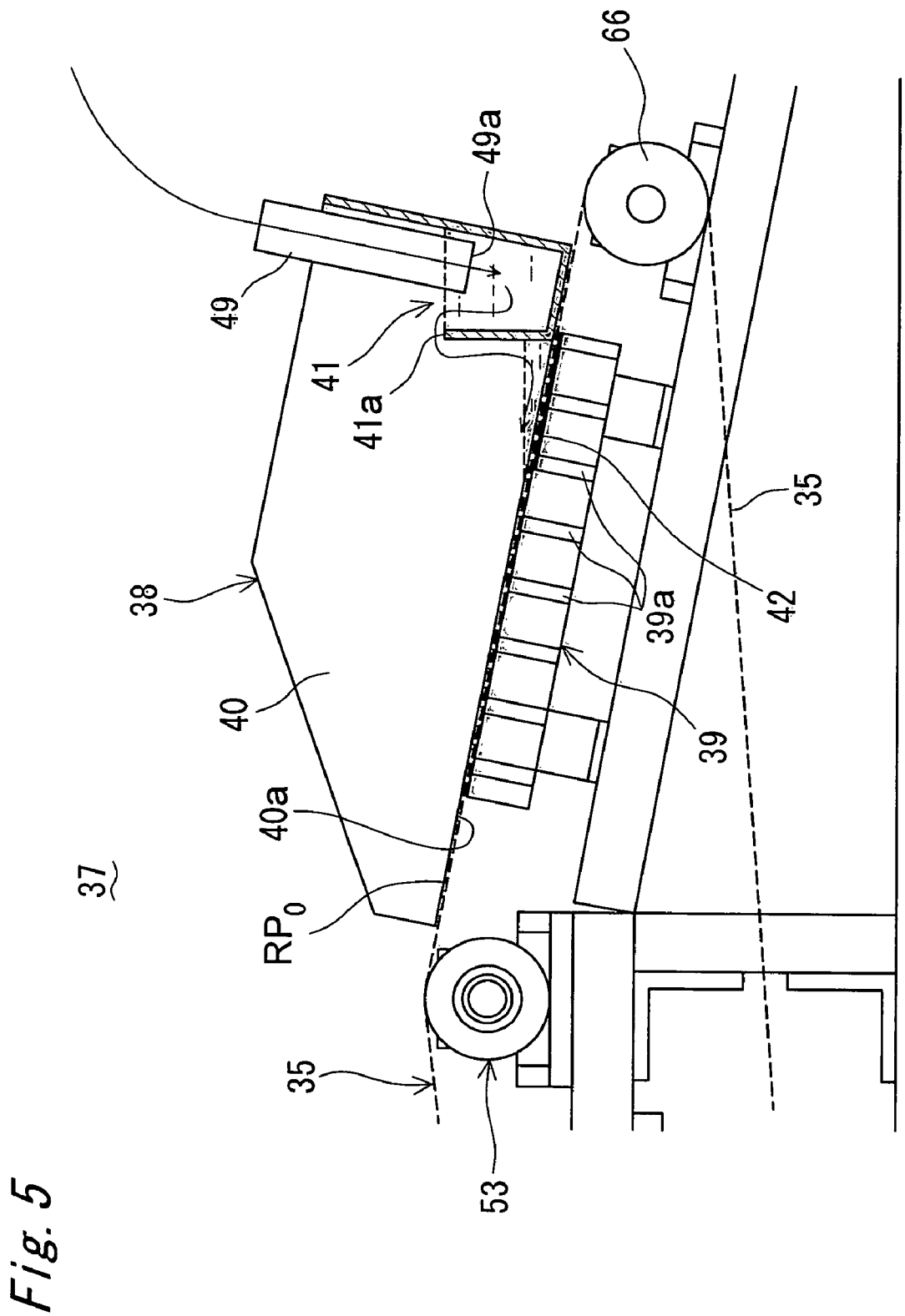
FIG. 5 is a partially cut-away front view of the pulp feeder.

A specific structure of the pulp feeder 37 is shown in FIG. 4 and FIG. 5. In this pulp feeder 37, the mesh endless belt 35 is disposed in an upward slope to the running direction, and at upper and lower sides of the mesh endless belt 35, deckle body 38 and partition member 39 are disposed.

The deckle body 38 is slidably disposed on the upper surface of the mesh endless belt 35, and as shown in FIG. 4 and FIG. 5, has a flat U-shaped main body frame 40 opened at the leading end, that is, the running direction end of the mesh endless belt 35, and an overflow tank 41 disposed at the rear end of the main body frame 40.

The main body frame 40 is disposed so as to slide on the upper surface of the mesh endless belt 35 on which the lower end face 40a runs obliquely, and the frame inner width dimension L (see FIG. 4) of the main body frame 40 is set at the width dimension of the recycled paper RP to be manufactured.

The overflow tank 41 is fixed integrally at the rear end of the main body frame 40, and its front wall upper end edge 41a is formed in a horizontal linear form, and a feed opening 49a of a suspension feed piping 49 for supplying the pulp suspension PS of pulp feed tank 45 is disposed oppositely in the overflow tank 41.

The pulp suspension PS is supplied and stored in the overflow tank 41 from the suspension feed piping 49, and when the overflow tank 41 is filled up with pulp suspension PS, by further supply of pulp suspension PS, the pulp suspension PS overflows from the front wall upper end edge 41a of the overflow tank 41 as indicated by arrow in FIG. 5, and flows down onto the flat member 42 of the partition member 39 described below.

The partition member 39 is disposed slidably on the lower side of the mesh endless belt 35, and as shown in FIG. 4 and FIG. 5, has a draining louver structure consisting of a plurality of skeleton members 39a, 39a, . . . , having shape and size for sliding and supporting the entire width of lower side of the mesh endless belt 35, and the base end portion of the louver structure is closed by the flat member 42.

The flat member 42 is disposed at a position corresponding to the overflow tank 41 of the deckle body 38, and specifically, as shown in FIG. 5, it is disposed oppositely to the flow-down position of pulp suspension PS overflowing from the overflow tank 41, and hence the mesh cells of flow-down supply position of pulp suspension PS of the mesh endless belt 35 are supported in closed state by the flat member 42.

At the upstream side of the pulp feeder 37, a pulp feed tank 45 is provided for supplying the pulp suspension PS into the pulp feeder 37.

In the pulp feed tank 45, pulp suspension PS manufactured in the pulp manufacturing section 2 is supplied and stored by a first suspension supply pump 27. The pulp suspension PS stored in the pulp feed tank 45 is detected by lower limit level float switch 46 and upper limit level float switch 47, and is continuously supplied into the overflow tank 41 of the pulp feeder 37 by a second suspension feed pump (suspension feed pump) 48.

The pulp suspension PS stored in the pulp feed tank 45 is supplied into the overflow tank 41 of the pulp feeder 37 by the second suspension feed pump 47, and the pulp suspension PS supplied in the overflow tank 41 overflows from the overflow tank 41 as shown in FIG. 4 and FIG. 5, and flows down onto the flat member 42. By the stagnant action of cooperation of main body frame 40 of deckle body 38 and partition member 39, the pulp suspension PS is uniformly diffused on the upper surface of the mesh endless belt 35, and by the running action in arrow direction of the mesh endless belt 35, it is further conveyed together with the mesh endless belt 35 while keeping the specified width dimension by the main body frame 40, and dehydrated by gravitational filtering action by mesh cells of the mesh endless belt 35, and wet paper $RP_0$ is prepared. The filtered and dehydrated white water W (pulp water of ultralow concentration filtered by mesh at the time of paper making) is collected in the white water recovery tank 15 of the water feeder 7.

In the pulp feeder 37, the running position of mesh endless belt 35 is supported and controlled so as to be horizontal in lateral direction, that is, the upper contour line on a section vertical to the running direction of mesh endless belt 35 may be in horizontal state. In this configuration, deviation in lateral width direction is prevented from occurring in the stagnant state of pulp suspension PS by cooperation of main body frame 40 and partition member 39, and the adjusted thickness of wet paper $RP_0$ is uniform in lateral width direction, so that the entire thickness of the paper will be uniform.

The dewatering roll section 31 is a position for squeezing and dehydrating the wet paper $RP_0$ on the mesh endless belt 35 at the linkage part of the paper making net conveyor 30 and drying belt conveyor 32 described below.

Specifically, a smooth surface endless belt 60 of the drying belt conveyor 32 at the downstream side, and the mesh endless belt 35 of the paper making net conveyor 30 at the upstream side are disposed in upper and lower layers as shown in FIG. 1 and FIG. 2, and the upper and lower adjacent parts of the smooth surface endless belt 60 and mesh endless belt 35 form the linkage part, and the dewatering roll section 31 rolls and squeezes the mesh endless belt 35 and smooth surface endless belt 60 by pressing from upper and lower sides.

The dewatering roll section 31 mainly comprises a dewatering roll 50, a press roll 51, and a drive motor 52, and also includes a preliminary dewatering roll 53, and a slurry preventive roll 54 as assisting parts.

The dewatering roll 50 rolls on the mesh endless belt 35 from the lower side, and is specifically composed of a cylindrical roll 50a of high rigidity material, and a dewatering sheet 50b of porous material of fine continuous pores wound on its outer circumference. The dewatering sheet 50b is made of a material excellent in hydrophilic, water absorbing and water retaining properties, and is preferably a porous material of fine continuous pores excellent in flexibility. Winding structure of dewatering sheet 50b on cylindrical roll 50a may be either single layer structure of winding a relatively thick dewatering sheet 50b once on the outer circumference of the cylindrical roll 50a, or multilayer structure of winding thin dewatering sheets 50b plural times on the outer circumference of the cylindrical roll 50a.

The dewatering roll 50 in the shown preferred embodiment is a single layer structure of a dewatering sheet 50b of specified thickness made of fine continuously foamed material of fine continuous pores of micron size wound once on the outer circumference of stainless steel cylindrical roll 50a, and more specifically the dewatering sheet 50b is preliminarily formed in a cylindrical shape, and this cylindrical body 50b is integrally fitted to the outer circumference of the cylindrical roll 50a.

The press roll 51 rolls and presses a smooth surface endless belt 60 of the drying belt conveyor 32 described below from the upper side, and is specifically a cylindrical roll of high rigidity material. The press roll 51 in the shown preferred embodiment is a stainless steel cylindrical roll.

The dewatering roll 50 and press roll 51 are linked and driven by a single drive motor 52, and the two rolls 50, 51 are rotated and driven in cooperation. In this case, the two rolls 50, 51 are rotated and controlled so that the outer circumferences of rolls 50, 51 may roll and contact substantially at equal rotating speed, on the mesh endless belt and contact surface of smooth surface endless belt 60 (the lower side of mesh endless belt 35 and upper side of smooth surface endless belt 60) being pressed, rolled and squeezed between their outer circumferences.

The drive motor 52 in the shown preferred embodiment is used commonly with the drive motor 36 of the paper making net conveyor 30 as described below.

By driving of the drive motor 52 (36), the both rolls 50, 51 roll and squeeze on the both belts 35, 60 by pressing from upper and lower sides, and moisture M contained in the wet paper $RP_0$ on the mesh endless belt 35 is absorbed and dehydrated by the dewatering roll 50 through the mesh endless belt 35. The squeezed and removed white water W is collected in the white water recovery tank 15 of the water feeder 7.

The squeezing and dehydrating mechanism is specifically described below by referring to FIG. 6A. By rotation of both rolls 50, 51, the mesh endless belt 35 having the wet paper $RP_0$ mounted on the upper side, and the smooth surface endless belt 60 are guided in between the rolls 50, 51 having the wet paper $RP_0$ interposed between them, and rolled and squeezed as being pressed from upper and lower sides. As a result, the moisture M contained in the wet paper $RP_0$ is squeezed out to the upstream side of the rolls 50, 51 (the right side in the drawing), but since the smooth surface endless belt 60 of the upper side is a smooth structure without pores, all squeezed moisture M passes through fine and continuous pores of the mesh endless belt 35 of the lower side, and is absorbed in the dewatering sheet 50b of the dewatering roll 50.

The preliminary dewatering roll 53 and slurry preventive roll 54 are provided for assisting the squeezing and dehydrating action of the press roll 51 and dewatering roll 50 in the dewatering roll section 31.

The preliminary dewatering roll 53 is disposed, as shown in FIG. 1, to apply a tension to the mesh endless belt 35 by rolling on the mesh endless belt 35 from the lower side, at the upstream side of the dewatering roll section 31.

Specific structure of preliminary dewatering roll 53 is same as that of dewatering roll 50, and on a cylindrical roll 53a of high rigidity material, a dewatering sheet 53b of porous material of fine continuous pores is wound. In the shown preferred embodiment, the preliminary dewatering roll 53 has a cylindrical body 53b of fine continuously foamed material of fine continuous pores of micron size, integrally fitted on the outer circumference of stainless steel cylindrical roll 53a (the dewatering sheet 53b in single layer structure).

The wet paper $RP_0$ uniformly diffused n the upper surface of the mesh endless belt 35 and conveyed together with the mesh endless belt 35 is filtered and dehydrated by the mesh endless belt 35, and the preliminary dewatering roll 53 also absorbs water and dehydrates, and assists the squeezing and dehydrating action by the press roll 51 and dewatering roll 50.

The slurry preventive roll 54 rolls and presses the smooth surface endless belt 60 from the upper side at a position near the upstream side of the dewatering roll section 31 as shown in FIG. 1 and FIG. 6B, and is disposed to press the smooth surface endless belt 60 to the wet paper $RP_0$ on the mesh endless belt 35 at the lower side.

Specific structure of slurry preventive roll 54 is same as in the press roll 51, and is specifically a cylindrical roll made of high rigidity material, and the slurry preventive roll 54 in the shown preferred embodiment is a stainless steel cylindrical roll.

Referring to FIG. 6B, by the dewatering roll 50 and press roll 51, when the mesh endless belt 35 mounting the wet paper $RP_0$ on the upper surface and the smooth surface endless belt 60 are rolled and squeezed as being pressed from upper and lower sides, the moisture M contained in the wet paper $RP_0$ is squeezed out to the upstream side of the both rolls 50, 51 (the right side in the drawing), and at the same time the moisture M held in the dewatering roll 50 as a result of squeezing and dehydrating action is also squeezed out.

In this case, if the slurry preventive roll 54 is not provided, as shown in FIG. 6A, at the position near the upstream side of the both rolls 50, 51, the smooth surface endless belt 60 at the upper side is separated from the wet paper $RP_0$ on the mesh endless belt 35 at the lower side, and part M' of combined moisture M of squeezed moisture contained in the wet paper $RP_0$ and moisture held in the dewatering roll 50 may not be absorbed by the dewatering roll 50 through the mesh endless belt 35, but may be absorbed in the wet paper $RP_0$, and the wet paper $RP_0$ may be formed into slurry again.

By contrast, when the slurry preventive roll 54 is provided, as shown in FIG. 6B, at a position near the upstream side of the both rolls 50, 51, the smooth surface endless belt 60 at the upper side is pressed on the wet paper $RP_0$ on the mesh endless belt 35 at the lower side, and all of moisture M of squeezed moisture contained in the wet paper $RP_0$ and moisture held in the dewatering roll 50 is dropped down to the lower side through the mesh endless belt 35, and is not absorbed again in the wet paper $RP_0$, and the wet paper $RP_0$ is securely prevented from being formed into slurry again, thereby assisting preliminarily the squeezing and dehydrating action by the press roll 51 and dehydrating roll 50.

Being squeezed by both rolls 50, 51, part of moisture M of wet paper $RP_0$ squeezed out to the upstream side passes between the rolls 50, 51 together with the dewatering sheet 50b of dewatering roll 50 and wet paper $RP_0$, and the moment after passing through the rolls 50, 51, the dewatering sheet 50b of the dewatering roll 50 elastically restores the original shape, and by this original shape restoring action, the wet paper $RP_0$ is further dehydrated. As a result, the moisture content of the wet paper $RP_0$ is reduced to specified value.

The wet paper $RP_0$ squeezed and dehydrated by the dewatering roll section 31 is transferred and rolled on the lower surface of the smooth surface endless belt 60 at the upper side from the upper surface of the mesh endless belt 35 at the lower side at the down stream side portion of dewatering roll section 31, and is conveyed together with the smooth surface endless belt 60, and dried by the drying belt conveyor 32.

This transfer action is considered to occur by the smooth surface structure of the smooth surface endless belt 60. That is, the surface of the mesh endless belt 35 at the lower side is a fine undulated surface having multiple fine continuous pores, while the surface of the smooth surface endless belt 60 at the upper side is a smooth surface having no pores, and hence the wet paper $RP_0$ slightly containing moisture is considered to be attracted by the surface tension against the surface of the smooth surface endless belt 60.

The drying belt conveyor 32 is for producing recycled paper RP by drying the wet paper $RP_0$ squeezed and dehydrated by the dewatering roll section 31 after paper making process at the paper making net conveyor 30, and includes the smooth surface endless belt 60, drive motor 61, and heating dryer 62.

The smooth surface endless belt 60 conveys the wet paper $RP_0$ while heating and drying, and specifically it is an endless belt having a plate member of smooth surface structure of specified width connected continuously in a loop of specified length. The specified width is slightly larger than the width dimension of the recycled paper RP to be manufactured, same as in the mesh endless belt 35. The plate member of smooth surface structure is made of a material capable of finishing the surface of one side of the wet paper $RP_0$ into a proper smooth surface, and withstanding the heating action by the heating dryer 62 mentioned below, and preferably it is made of fluoroplastic, stainless steel, for other elastic heat resistant material, and in the shown preferred embodiment, a fluoroplastic belt is used. The specified length is long enough for heating and drying the wet paper $RP_0$ to manufacture a desired recycled paper RP, and is set properly to be contained in the inner space of the drying belt conveyor 32 in the apparatus case 5.

The smooth surface endless belt 60 is, as shown in FIG. 1 and FIG. 2, suspended and supported rotatably by way of driving roller 70, driven rollers 71, 72, press roll 51, slurry preventive roll 54, smooth surface finishing rolls 73, 74, and preliminary dewatering roll 53, and is driven and coupled to the drive motor 61 by way of the driving roller 70.

Figure 3:
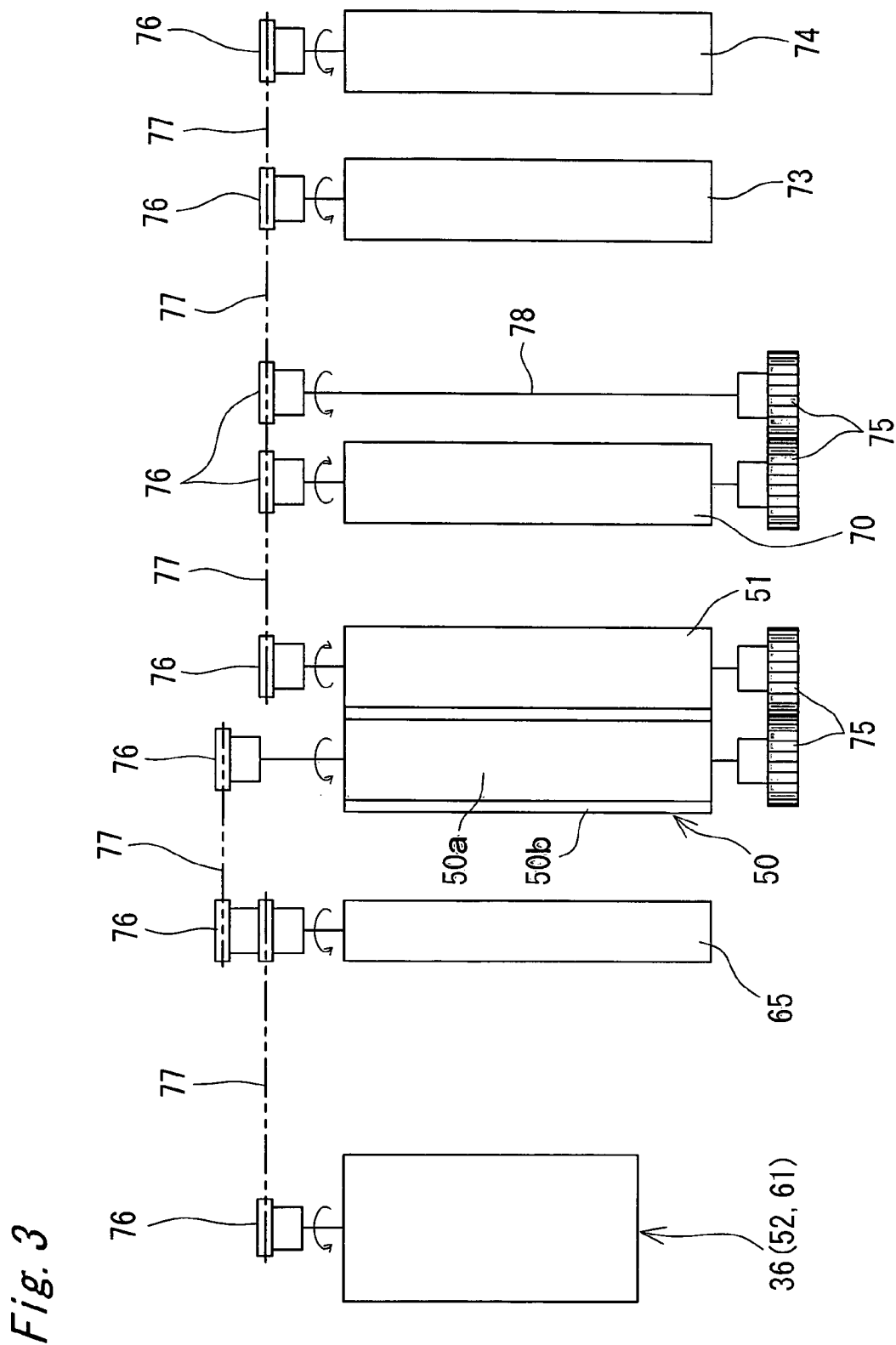
FIG. 3 is a plan view of drive linkage mechanism of the paper making section.

The drive motor 61 for running and driving the smooth surface endless belt 60 is commonly used as running and driving source of the paper making net conveyor 30 and dewatering roll section 31 as mentioned above, and a common structure or drive linkage mechanism is shown in FIG. 3.

In FIG. 3, reference numeral 75 is a power transmission gear, numeral 76 is a sprocket, numeral 77 is a power transmission chain applied between sprockets 76, 76, and numeral 78 is a power transmission shaft.

The gear ratio of power transmission gears 75, 75, . . . , and sprockets 76, 76, . . . is set so that, considering that the drive sources are a single drive motor 61, all of the driving roller 70, driven rollers 71, 72, press roll 51, slurry preventive roll 54, smooth surface finishing rolls 73, 74, and preliminary dewatering roll 53 may roll and contact on the smooth surface endless belt 60 mutually and substantially at same peripheral speed.

The heating dryer 62 is a section for heating and drying the wet paper $RP_0$ on the smooth surface endless belt 60, and includes, as heating unit, a heater plate 75 disposed on the way in the running route of the smooth surface endless belt 60.

The heater plate 75 in the shown preferred embodiment is provided in the horizontal running portion in the running route of the smooth surface endless belt 60, and specifically it is provided to slide on the opposite side of the upper side of holding surface of the wet paper $RP_0$, that is, at the lower side in the smooth surface endless belt 60. Hence, the wet paper $RP_0$ on the smooth surface endless belt 60 is heated and dried indirectly by the smooth surface endless belt 60 heated by the heater plate 75.

On the way of the running route of the smooth surface endless belt 60, two smooth surface finishing rolls 73, 74 are disposed. Specifically, these smooth surface finishing rolls 73, 74 are disposed in parallel, opposite to the heater plate 75, in the horizontal running portion of the running route of the smooth surface endless belt 60.

The both smooth surface finishing rolls 73, 74 sequentially roll and press the wet paper $RP_0$ on the smooth surface endless belt 60, and finish into proper smooth surface on the opposite side of one side of the wet paper $RP_0$ contacting with the surface of the smooth surface endless belt 60.

In the shown preferred embodiment, two smooth surface finishing rolls 73, 74 are provided, but the number of smooth surface finishing rolls may be increased or decreased depending on the purpose.

At the downstream side of the heating dryer 62 on the smooth surface endless belt 60, a parting member 80 is provided. The parting member 80 is specifically an elastic spatula having heat resistance, and the parting member 80 in the shown preferred embodiment coated with Teflon (registered trademark) on the outer circumference of an elastically deformable stainless steel plate of about 0.1 to 0.3 mm in thickness, and its base end is supported on the fixing side (not shown), and its leading end edge 80a is elastically stopped on the surface of smooth surface endless belt 60.

The dry paper dried and conveyed on the smooth surface endless belt 60, that is, the recycled paper RP is sequentially parted from the holding surface of the smooth surface endless belt 60 by the leading end edge 80a of the parting member 80.

In this relation, at the downstream side of the parting member 80 or at the running route terminal end position of the smooth surface endless belt 60, a fixed size cutter 81 is provided. Specific structure of fixed size cutter 81 is not shown, and is, for example, a conventional both-side slitter, or a guillotine cutter by solenoid.

The recycled paper RP parted from the smooth surface endless belt 60 is cut to a specified length (vertical size of A4 format in the shown preferred embodiment) by the fixed size cutter 81, and a recycled paper RP in size and shape ready for recycling is manufactured and discharged from an outlet 82 of the apparatus case 5. In this case, cutting into specified length is controlled by measuring the belt feed rate of the smooth surface endless belt 60 by a proximity switch or other sensor.

IV. Control Section 4:

The control section 4 automatically controls the operations of driving parts of the pulp manufacturing section 2 and paper making section 3 in cooperation, and is specifically composed of a microcomputer comprising CPU, ROM, RAM and I/O port.

The control section 4 incorporates programs for executing the pulp manufacturing process of the pulp manufacturing section 2 and paper making process of the paper making section 3 continuously, and also stores various pieces of information necessary for driving the driving parts, for example, driving time of agitating device 6 of pulp manufacturing section 2, operation timing of paper feeder 7, running speed of conveyors 30, 32 in paper making section 3, driving time of heating dryer 62, operation timing of fixed size cutter 81, and others, preliminarily as data or by selective input by keyboard or the like.

In the control section 4, as mentioned above, float switches 18, 19, 26, 46, 47, and drive units 12, 16, 27, 36 (52, 61), 48, 75, 81 are connected electrically, and the control section 4 controls the control units 12, 16, 27, 36 (52, 61), 48, 75, 81 according to the measured values and stored data.

The used paper processing apparatus 1 having such configuration is started when the power source is turned on, and the drive parts are automatically controlled relatively by the control section 4, and the following processes are executed. Consequently, the used papers UP, UP, . . . charged into the used paper processing apparatus 1 are macerated and processed by the pulp manufacturing section 2, and leak or disclosure of confidential information or personal information contained in the use paper UP can be effectively prevented, and the used paper pulp UPP is processed by the paper making section 3, and is reproduced as recycled paper RP.

i) The heater plate 75 of the heating dryer 62 starts heat generation, and reaches specified temperature, and the specified temperature is maintained automatically thereafter.

ii) A specified amount of water W is supplied into the agitation tank 10 of the agitating device 6 from the water feeder 7. The specified amount is a minimum volume for macerating and beating the used papers UP, UP, . . . charged into the agitation tank 10 (about 3 liters in the shown preferred embodiment), and the feed time of the water feed pump 16 is controlled by a timer.

iii) A specified number of sheets (amount) of used papers UP, UP, . . . determined from the processing capacity of the apparatus 1 (in the shown preferred embodiment, about 8 sheets of A4 size, or about 32 g) is charged from the inlet 10a of the agitating device 6, and when the start switch is turned on, the agitating device 6 is put in operation, and the agitating blades 11 are driven by a timer for a specified time (in the shown preferred embodiment, about 3 to 5 minutes) by repeating normal rotation and reverse rotation, and the used papers UP, UP, . . . are macerated and beaten, and used paper pulp UPP is prepared.

iv) When used papers UP, UP, . . . are sufficiently macerated and beaten into used paper pulp UPP, the drain valve of the agitating device 6 is opened, and the whole volume of used paper pulp UPP in the agitation tank 10 is discharged into the concentration adjusting tank 25.

In this case, also for the purpose of cleaning of inside of the agitation tank 10, water is supplied into the agitation tank 10 from the water feeder 7 and the agitating blades 11 are rotated in the midst of discharge of used paper pulp UPP. The opening time of drain valve, supply of cleaning water, and rotation of agitating blades 11 are all controlled sequentially by the timer.

v) Simultaneously with or after discharge of used paper pulp UPP into the concentration adjusting tank 25, white water W is added into the concentration adjusting tank 25 from the water feeder for concentration adjustment 7. Supply of white water W continues until a specified water level is detected by the float switch 26 in the concentration adjusting tank 25. By addition of white water W, the concentration of used paper pulp UPP is adjusted, and a pulp suspension PS of specified concentration is obtained.

In the shown preferred embodiment, in the whole volume of used paper pulp UPP (about 32 g of used paper UP+3 liters of water W), white water W is added until the water volume in the concentration adjusting tank 25 is 30 liters, that is, the total volume (total amount) of used paper pulp UPP and water W is 30 liters, and pulp suspension PS of about 0.1% in concentration is prepared.

vi) The pulp concentration PS is adjusted to specified concentration in the concentration adjusting tank 25, and when the float switch 26 is turned on, the first suspension feed pump 27 is put in operation, and nearly whole volume is supplied into the pulp feed tank 45. This supply of whole volume is also controlled by the timer.

While the pulp suspension is being supplied into the pulp feed tank 45, water in the white water recovery tank 15 is not added to the concentration adjusting tank 25 (to prevent the adjusted concentration from varying).

vii) When the lower limit level float switch 46 in the pulp feed tank 45 (disposed corresponding to a minimum water level necessary for starting paper making process) is turned on, the drive motor 36 (52, 61) is driven, and the mesh endless belt 35 is driven, and paper making process is started, and the pulp suspension PS in the pulp feed tank 45 is supplied into the overflow tank 41 of the pulp feeder 37 by second suspension feed pump 47.

In this case, by the portion of the time of supply of pulp suspension PS into the pulp feeder 37, the drive motor 36 (52, 61) is driven after a time lag, and the mesh endless belt 35 is operated by delay.

The drive motor 36 (52, 61) is commonly used as drive source not only for the mesh endless belt 35, but also for rotation of rolls 50, 51 of dewatering roll section 31, running of smooth surface endless belt 60 of drying belt conveyor 32, and rotation of smooth surface finishing rolls 73, 74, and they are simultaneously driven in cooperation.

viii) The pulp suspension PS supplied in the overflow tank 41 overflows from the overflow tank 41, and flows down onto the flat member 42 of the partition member 39, and is uniformly diffused on the upper surface of the mesh endless belt 35 by stagnant action by cooperation of the main body frame 40 of deckle body 38 and partition member 39. At the same time, by the running action of mesh endless belt 35, the diffused pulp suspension PS is pulled and conveyed by the mesh endless belt 35 while keeping the width dimension L specified by the main body frame 40, and is filtered and dehydrated by mesh cells of the mesh endless belt 35, and wet paper $RP_0$ is obtained.

White water W filtered and dehydrated by the mesh endless belt 35 is collected in the white water recovery tank 15 of the water feeder 7, and circulated and reused.

ix) The wet paper $RP_0$ conveyed together with the mesh endless belt 35 reaches the preliminary dewatering roll 53, and the position is changed from oblique running state to horizontal running state, and it is lightly dehydrated by synergistic effect by cooperation with water absorbing action of preliminary drying roll 53, and is pressed by the slurry preventive roll 54, and is held between the mesh endless belt 35 and smooth surface endless belt 60, and sent into the dewatering roll section 31.

x) In the dewatering roll section 31, by the pressing action of the slurry preventive roll 54, the wet paper $RP_0$ held between the mesh endless belt 35 and smooth surface endless belt 60 passes between the dewatering roll 50 and press roll 51 as being pressed, rolled and squeezed between the upper and lower sides by the two rolls 50, 51. As a result, as described above, the wet paper $RP_0$ is dehydrated to specified moisture content by the squeezing and dewatering mechanism as shown in FIG. 6B, also by the preliminary assisting action of the slurry preventive roll 54.

xi) The wet paper $RP_0$ squeezed and dehydrated by the dewatering roll section 31 is conveyed to a downstream side position of the dewatering roll section 31, and is transferred and rolled on the smooth surface endless belt 60 at the upper side from the mesh endless belt 35 of the lower side, is conveyed together with the smooth surface endless belt 60, and is heated and dried by the heater plate 75 of the drying belt conveyor 32, and a recycle paper RP is manufactured.

At the same time, the wet paper $RP_0$ or recycled paper RP is finished into a proper smooth surface on the surface of opposite side of the surface contacting with the surface of the smooth surface endless belt 60, by continuous rolling pressure of two smooth surface finishing rolls 73, 74 disposed at the opposite side of the heater plate 75 to the smooth surface endless belt 60.

xii) After surface finishing by the two smooth surface finishing rolls 73, 74, the recycled paper RP is held on the surface of smooth surface endless belt 60 in affixed state, and by the leading end edge 80a of the parting member 80, it is sequentially parted from the holding surface of the smooth surface endless belt 60, and cut to a specified length by the fixed size cutter 81, and is discharged from the outlet 82 of the apparatus case 5 as recycled paper RP in reusable size and shape.

xiii) When the pulp suspension PS in the pulp feed tank 45 decreases from the minimum water volume necessary for starting paper making (almost empty state), the lower limit level float switch 46 is turned off, and supply of pulp suspension PS by second suspension feed pump 47 is stopped, and the drive motor 36 (52, 61) is also stopped, and the paper making process is stopped.

In this case, the drive motor 36 (52, 61) is stopped after specified time lag corresponding to the portion of the time until the pulp suspension PS presently in the paper making process is fully manufactured into recycled paper RP and discharged from the outlet 82.

xiv) Back to process iii), a specified number of sheets (amount) of used papers UP, UP, . . . determined from the processing capacity of the apparatus 1 (in the shown preferred embodiment, about 8 sheets of A4 size, or about 32 g) is charged additionally, and when the start switch is turned on again, the process from iv) to xiii) is executed sequentially and continuously.

The process herein shows the operation necessary for manufacturing used paper pulp and recycled paper, and actual operation is provided with various safety measures and interlock controls.

The used paper processing apparatus 1 having such configuration brings about the following effects, and it can be place not only in a large office but also in small shop or general household, and is capable of securely preventing leak or disclosure of confidential information, personal information and other information, keeping high level of secrecy, friendly to the environment, and low in running cost.

(1) Being place in a place of origin of used paper, the apparatus has the pulp manufacturing section 2 for macerating and beating the used paper UP into used paper pulp UPP, and the used paper UP is decomposed into fiber level (as pulp), and the printed characters and diagrams are completely decomposed and eliminated, and cannot be restored. Hence leak and disclosure of confidential information, personal information and other private information composed of characters and diagrams can be securely prevented, and a high secrecy is maintained.

(2) By the paper making section 3 for processing the used paper pulp UPP manufactured in the pulp manufacturing section and manufacturing recycled paper RP, used paper UP is not discarded, but can be recycled and used as recycled paper in the place of origin of used paper UP, and disposal of used paper UP is reduced, and refuse problems can be solved and limited resources can be utilized effectively.

Recycling of this kind of used paper UP is not promoted because of confidential problems, and by recycling in the place of origin of used paper UP, the effect of effective use of resources is evident.

(3) In a furniture size apparatus case 5, the pulp manufacturing section 2, paper making section 3, and control section 4 for driving and controlling them in cooperation are contained, and the apparatus size is compact, and it can be place not only in a large office, but also in small shop or general household, and from this viewpoint, too, leak and disclosure of confidential information, personal information and other private information can be securely prevented.

(4) Water W used in the pulp manufacturing section 2 is water W dehydrated and recovered from the paper making section 3 by water circulation system, an the driving source of pulp manufacturing section 2 and paper making section 3 is supplied from general household alternating-current power source, and it is friendly to the environment and low in running cost, and is hence economical.

Preferred Embodiment 2

Figure 7:
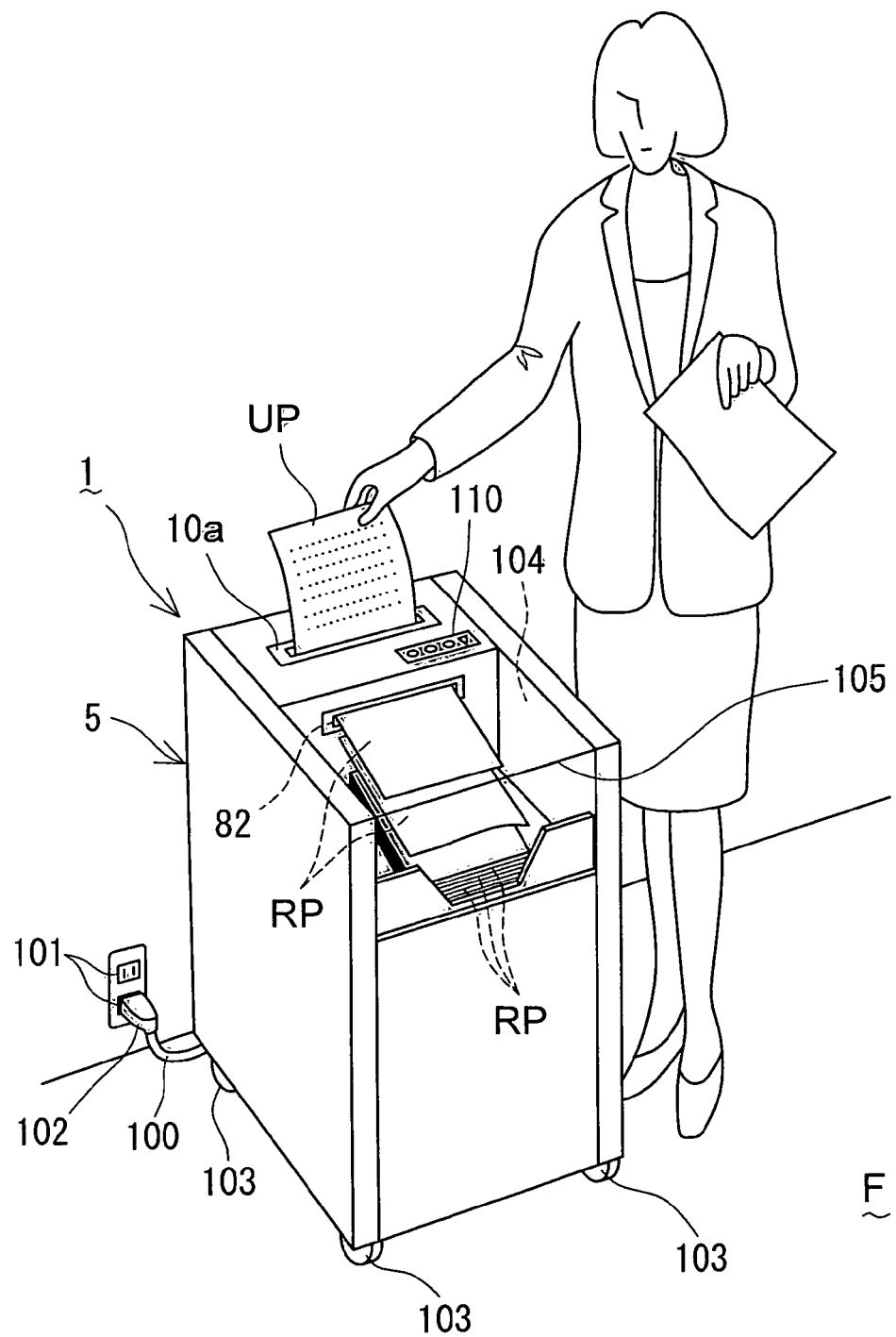
FIG. 7 is a perspective view of the outline of used paper processing apparatus in preferred embodiment 2 of the invention.
Figure 8:
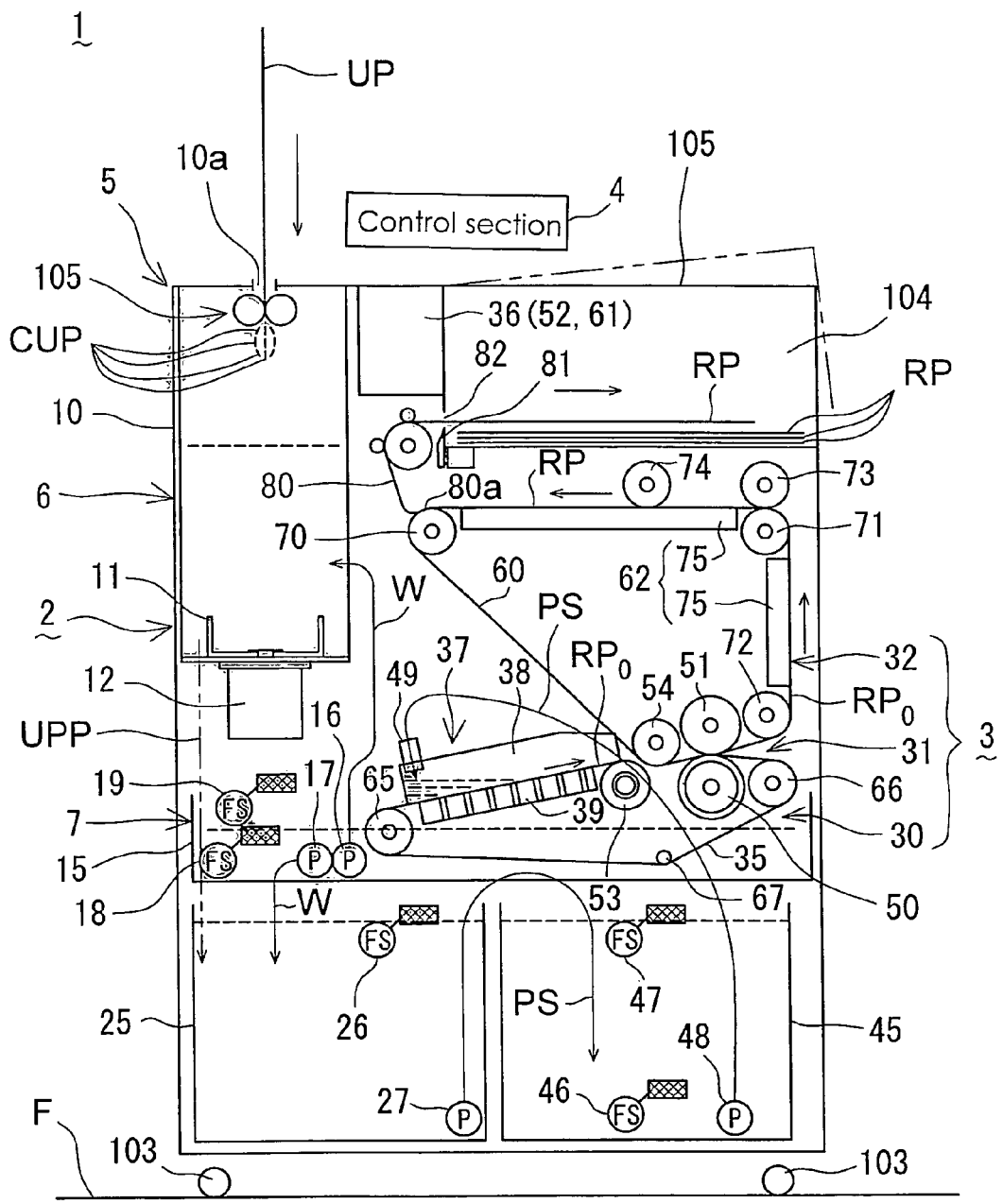
FIG. 8 is a front view of the entire used paper processing apparatus, shown by cutting open the apparatus case.

This preferred embodiment is shown in FIG. 7 and FIG. 8, and is slightly modified from the used paper processing apparatus 1 in preferred embodiment 1.

That is, the used paper processing apparatus 1 of the preferred embodiment has a compact appearance of versatile type as shown in FIG. 7, to be place and used anywhere, including business scene of public or private offices, or general household or private place.

Driving sources of components of used paper processing apparatus 1, that is, pulp manufacturing section 2 and paper making section 3, are driving power sources driven by alternating-current power source for general household same as in preferred embodiment 1, and hence, as shown in FIG. 7, and the leading end of power cord 100 has a plug 102 to be inserted and connected in a wall outlet 101 of office of general company or room of general household.

The apparatus case 5 is a box smaller than a copier in a general office, and castors 103, 103, . . . are provided in the bottom as moving means, so that it can be moved freely on the floor F of installation as shown in FIG. 7.

The top plate of the apparatus case 5 has an inlet 10a for charging used paper UP, and an operation panel 110 having start switch and other operation buttons, and the front side of the upper end has a recycled paper stock 104 for storing recycled papers RP, RP, . . . . The recycled paper stock 104 has an outlet 82 opposite to the apparatus case 5, and recycled papers RP, RP, . . . discharged from the outlet 82 are stacked up sequentially. The recycled paper stock 104 also has a transparent protective cover 105 opened and closed from the top.

The inlet 10a of the agitation tank 10 has a shredder 105. The shredder 105 preliminarily shreds the used papers UP, UP, . . . charged into the inlet 10a, so as to be macerated and beaten efficiently by the agitating device 6.

Specific structure of shredder 105 has a mechanism of cutting used paper UP into small pieces like the conventional shredder, but the cutting size by this cutting mechanism is designed to satisfy the following conditions.

That is, in the conventional shredder, characters and diagrams printed on the used paper UP are cut into invisible and illegible small pieces, so as to prevent leak or disclosure of confidential information or personal information composed of these characters and diagrams, but the main purpose of the shredder 105 in the preferred embodiment is to cut into a size having desired properties as material pulp of recycled paper RP to be manufactured in paper making section 3 in next process of used paper pulp UPP manufactured from cut used papers CUP, CUP, . . . .

For this purpose, the cutting size of cutting mechanism of the shredder 105 is set to a degree so that paper fiber of cut used paper CUP may not be cut more than the size desired as material pulp of recycled paper RP. Therefore, as far as this condition is satisfied, the specific structure of cutting mechanism may include double cutting method, cross cutting method, and other methods.

When used paper UP is charged into the inlet 10a, the used paper UP is cut preliminarily by the shredder 105 to be cut used papers CUP, CUP, . . . of specified size, and is agitated for a specified time in water W supplied from the water feeder 7 by normal and reverse rotation of agitating blades 11 of the agitating device 6, and macerated and beaten into used paper pulp UPP. The time required for macerating and beating is shorter than in preferred embodiment 1.

Other components, that is, water feeder 7 and pulp concentration adjusting unit 8 of pulp manufacturing section 2, paper making net conveyor 30, dewatering roll section 31 and drying belt conveyor 32 of paper making section 3, and specific structure and action of the control section 4 are substantially same as in preferred embodiment 1, except for compact design by downsizing of the apparatus case 5.

Preferred Embodiment 3

Figure 9:
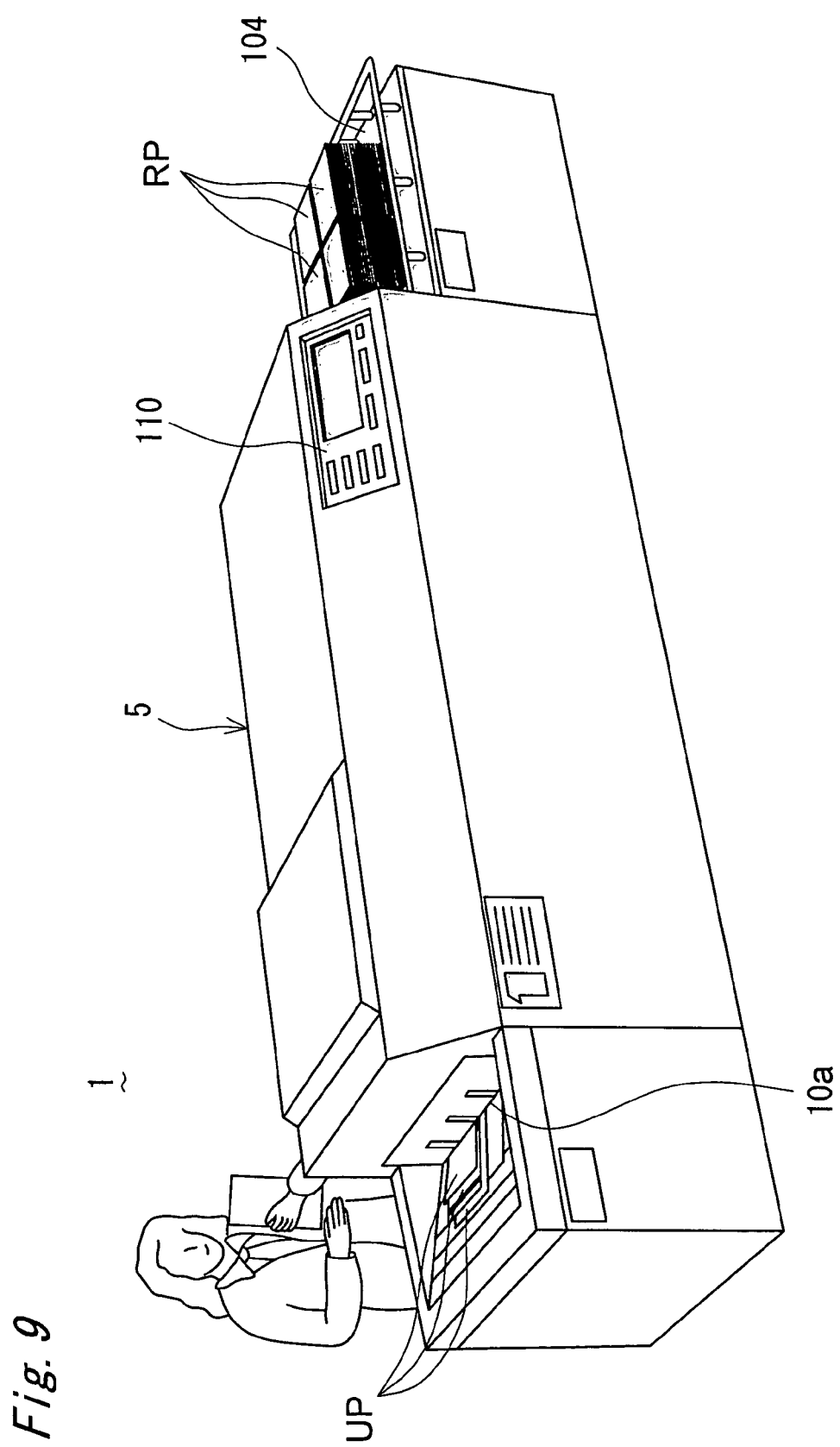
FIG. 9 is a perspective view of the outline of used paper processing apparatus in preferred embodiment 3 of the invention.

This preferred embodiment is shown in FIG. 9, and is slightly modified from the used paper processing apparatus 1 in preferred embodiment 1.

That is, the used paper processing apparatus 1 of the preferred embodiment has a large size to be place and used particularly in business scene of public or private offices, other large offices and exclusive processing rooms.

Specific internal structure of used paper processing apparatus 1 is not shown, but similar to preferred embodiment 1 and preferred embodiment 2, except that the size is increased, the processing capacity is enhanced, or the layout is changed in the components, such as agitating device 6, water feeder 7 and pulp concentration adjusting unit 8 of pulp manufacturing section 2, paper making net conveyor 30, dewatering roll section 31 and drying belt conveyor 32 of paper making section 3, and used paper UP, used paper UP, . . . can be processed massively.

Therefore, in the used paper processing apparatus 1 having such configuration, where a large space of installation is available, by charging used paper UP, used paper UP, . . . into the inlet 10a periodically, such as once a year, or several times a year, and the used paper is processed sequentially as explained in preferred embodiment 1 by the pulp manufacturing section 2 and paper making section 3 in the apparatus case 5, and lots of processed papers RP, RP, . . . are continuously discharged from outlet (not shown) into recycled paper stock 104, and the recycled papers RP, RP, . . . are stacked up sequentially in layers by manual work or stacking mechanism (not shown) of the used paper processing apparatus 1 as shown in the drawing.

Preferred Embodiment 4

Figure 10:
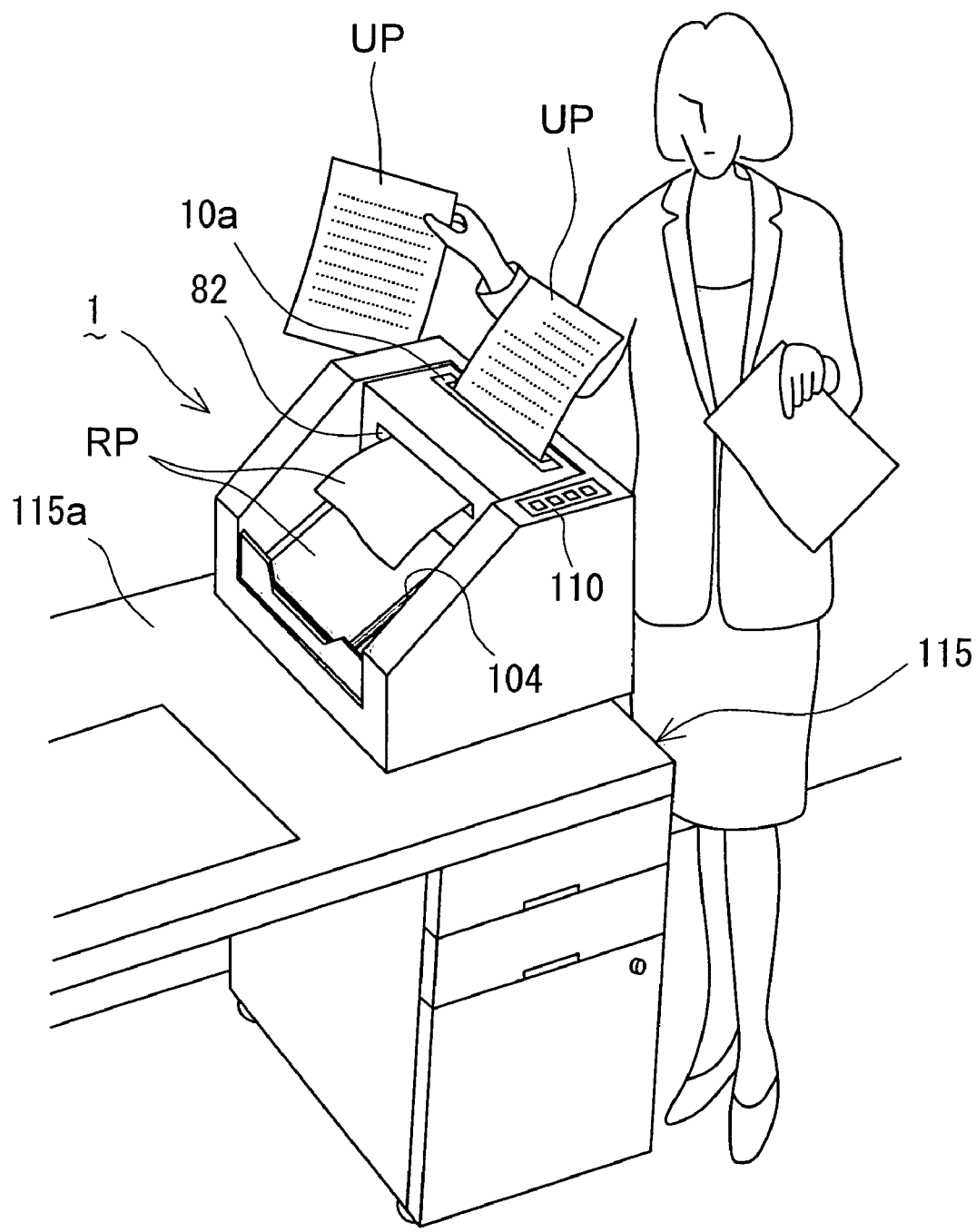
FIG. 10 is a perspective view of the outline of used paper processing apparatus in preferred embodiment 4 of the invention.

This preferred embodiment is shown in FIG. 10, and is slightly modified from the used paper processing apparatus 1 in preferred embodiment 1.

That is, the used paper processing apparatus 1 of the preferred embodiment has a small desktop size to be place and used particularly in narrow space at a corner of top plate 115a of an office desk 115 shown in the drawing, used in a personal space of small office or general household.

Specific internal structure of used paper processing apparatus 1 is not shown as in preferred embodiment 3, but similar to preferred embodiment 1 and preferred embodiment 2, except that the size is decreased, or the processing capacity is limited in the components, such as agitating device 6, water feeder 7 and pulp concentration adjusting unit 8 of pulp manufacturing section 2, paper making net conveyor 30, dewatering roll section 31 and drying belt conveyor 32 of paper making section 3, and used paper UP, used paper UP, . . . can be processed in a small quantity.

Thus, the used paper processing apparatus 1 having such configuration is put on a desk 115 as shown in the drawing, and is used for processing a small amount of used papers UP, UP, . . . occurring in route work or daily life by charging one by one into the inlet 10a on every occasion, and the used paper is processed sequentially and continuously by the pulp manufacturing section 2 and paper making section 3 in the apparatus case 5 as explained in preferred embodiment 1, and discharged sequentially as recycled paper PR from the outlet into the recycle paper stock 104, and stacked up automatically.

The foregoing preferred embodiments 1 to 4 are only preferred examples of the invention, and the invention is not limited to these examples alone, but may be changed and modified within the true spirit and scope thereof. For example, following modifications may be included.

(1) In the shown preferred embodiment, the heater plate 75 is used as heating unit of the heating dryer 62, but instead of the heater plate 75, rotatable heater roll, hot air heater, and other heating means may be used.

That is, although not shown in the drawing, when the heater roll is used as heating unit of the heating dryer 62, for example, the heater roll is disposed to roll directly on the wet paper $RP_0$ on the smooth surface endless belt 60, so that the wet paper $RP_0$ on the smooth surface endless belt 60 may be directly heated and dried by the heater roll.

Or when the hot air heater is used as heating unit of the heating dryer 62, for example, the hot air heater blows hot air to the wet paper $RP_0$ on the smooth surface endless belt 60, so that the wet paper $RP_0$ on the smooth surface endless belt 60 may be directly heated and dried by the hot air heater.

(2) Specific processing step by the control section 4 may be changed by modifying the program, so as to be different from the process executed in preferred embodiment 1 (pulp manufacturing process of pulp manufacturing section 2 and paper making process of paper making section 3), or the design may be changed properly depending on the purpose or processing capacity.

As this invention may be embodied in several forms without departing from the spirit of the essential characteristics thereof, the present preferred embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A used paper processing apparatus placed in a place of origin of used paper, for preventing leak or disclosure of confidential information or personal information contained in the paper by macerating the used paper, comprising:

a pulp manufacturing section for manufacturing used paper pulp by macerating and beating the used paper, a paper making section for manufacturing recycled paper by making the used paper pulp manufactured in the pulp manufacturing section, and a control section for driving and controlling by interlocking the pulp manufacturing section and paper making section, wherein the pulp manufacturing section, paper making section and control section are contained in a furniture size apparatus case, wherein the paper making section includes a paper making net conveyor for making a wet paper from pulp suspension slurry containing water and used paper pulp sent from the pulp manufacturing section, a drying belt conveyor for making recycled paper by drying the wet paper formed by the paper making net conveyor, and a dewatering roll for squeezing and dewatering the wet paper in a combined portion of paper making net conveyor and drying belt conveyor, the pulp suspension supplied from the pulp manufacturing section is processed, dewatered and dried, wherein the drying belt conveyor includes a smooth surface endless belt having a specified width for receiving and conveying the wet paper processed and formed in the paper making net conveyor, a drive motor for driving this smooth surface endless belt, and a heating dryer for heating and drying the wet paper on the smooth endless belt, and the wet paper squeezed and dewatered in the paper making net conveyor at downstream position of the dewatering: roll is transferred adhered and conveyed to the lower side of the smooth surface endless belt by the smooth surface structure of the smooth surface endless belt.

2. The used paper processing apparatus of claim 1, wherein the water used in the pulp manufacturing section is wastewater from the paper making section recirculated by water circulation system.

3. The used paper processing apparatus of claim 1, wherein the drive source of pulp manufacturing section and paper making section is a motor drive source driven by power source for general household.

4. The used paper processing apparatus of claim 1, wherein moving means is provided in the apparatus case, so as to be movable on the floor of installation.

5. The used paper processing apparatus of claim 1, wherein the pulp manufacturing section includes agitating means for agitating used paper, and water feed means for supplying water to the agitating means, and macerated used paper supplied from a supply opening of the apparatus case is agitated in water, and further macerated and beaten.

6. The used paper processing apparatus of claim 5, wherein the agitating means has an inlet of used paper, and also includes an agitation tank storing water supplied from the water feed means, agitating blades provided rotatably in the agitation tank, and a drive motor for rotating and driving the agitating blades.

7. The used paper processing apparatus of claim 6, wherein a shredder is provided in the inlet of the agitation tank, and the used paper supplied in the opening is preliminarily cut by the shredder, and is further agitated by the agitating blades.

8. The used paper processing apparatus of claim 5, wherein the water feed means includes a white water recovery tank for collecting white water filtered and dehydrated in the paper making section, and a water feed pump for supplying the water in the white water recovery tank in the agitating means of pulp manufacturing section.

9. The used paper processing apparatus of claim 6,
wherein the pulp manufacturing section has pulp concentration adjusting means disposed at the downstream side of the agitation tank for adjusting the concentration of the used paper pulp manufactured in the agitation tank,
this pulp concentration adjusting means includes a concentration adjusting tank storing the used paper pulp manufactured in the agitation tank, and water feed means for adjusting concentration for supplying water into the concentration adjusting tank, and
the concentration of used paper pulp manufactured in the agitation tank is adjusted by addition of water from the water feed means for adjusting concentration, and a pulp suspension of specified concentration is prepared.

10. The used paper processing apparatus of claim 9,
wherein water is added from the water feed means for adjusting concentration to whole volume of used paper pulp manufactured in the agitation tank, and the concentration adjusting tank is composed to prepare the pulp suspension of specified concentration by the total volume of used paper pulp and water to a specified volume.

11. The used paper processing apparatus of claim 9,
wherein the water feed means for supplying water into the agitating means also functions as water feed means for adjusting concentration.

12. The used paper processing apparatus of claim 1,
wherein the paper making net conveyor has a mesh endless belt having a specified width for processing and conveying the pulp suspension, a drive motor for driving the mesh endless belt, and a pulp feeder for supplying the pulp suspension from the pulp manufacturing section onto the mesh endless belt, and by this pulp feeder, the pulp suspension is spread and supplied uniformly on the upper surface of the mesh endless belt.

13. The used paper processing apparatus of claim 12,
wherein in the pulp feeder, the mesh endless belt is disposed obliquely upward to the running direction,
the pulp feeder has a partition member disposed slidably on the lower side of the mesh endless belt, and a deckle body disposed slidably on the upper side of the mesh endless belt, and
the pulp suspension supplied in the deckle body is diffused uniformly on the upper side of the mesh endless belt by stagnant action by cooperation of deckle body and partition member, and is conveyed together with the mesh endless belt while keeping a width dimension specified by the deckle body by running action of mesh endless belt, and is dewatered by the own gravitational action by the mesh of the mesh endless belt.

14. The used paper processing apparatus of claim 13,
wherein the partition member has a louver structure for slidably supporting the lower side of the mesh endless belt, and the flow-down supply portion of the pulp suspension at the base end side has a flat plate member for supporting the mesh of the mesh endless belt in closed state.

15. The used paper processing apparatus of claim 14,
wherein an overflow tank is provided in the deckle body, and the pulp suspension supplied in the deckle body is once collected in the overflow tank, and overflows, and flows down onto the flat plate member of the partition member.

16. The used paper processing apparatus of claim 12,
wherein a pulp supply tank storing the pulp suspension manufactured in the pulp manufacturing section is provided at the upstream side of the pulp feeder, and the pulp suspension in the pulp supply tank is continuously supplied into the deckle body of the pulp feeder by a suspension feed pump.

17. The used paper processing apparatus of claim 1,
wherein the heating dryer has a heater plate adjacent to an opposite side of holding surface of the wet paper on the smooth surface endless belt, and the wet paper on the smooth surface endless belt is heated and dried indirectly by the smooth surface endless belt heated by the heater plate.

18. The used paper processing apparatus of claim 1,
wherein the heating dryer has a rotatable heater roll rolling on the wet paper on the smooth surface endless belt, and the wet paper on the smooth surface endless belt is heated and dried directly by the heater roll.

19. The used paper processing apparatus of claim 1,
wherein the heating dryer has a hot air heater for blowing a hot air to the wet paper on the smooth surface endless belt, and the wet paper on the smooth surface endless belt is heated and dried directly by the hot air heater.

20. The used paper processing apparatus of claim 1,
wherein the smooth surface endless belt is composed of a thermoplastic heat resistant material capable of withstanding heat of the heating dryer.

21. The used paper processing apparatus of claim 20,
wherein the smooth surface endless belt is a fluoroplastic belt.

22. The used paper processing apparatus of claim 20,
wherein the smooth surface endless belt is a steel belt.

23. The used paper processing apparatus of claim 1,
wherein the dewatering roll squeezes and dewaters the wet paper on the mesh endless belt by pressing, rolling and squeezing the mesh endless belt of the paper making net conveyor and the smooth surface endless belt of the drying belt conveyor from the upper and lower sides.

24. The used paper processing apparatus of claim 23,
wherein the dewatering roll has a dewatering roll rolling on the mesh endless belt from the lower side, a press roll for rolling and pressuring the smooth surface endless belt from the upper side on the dewatering roll, and a drive motor for rotating and driving these two rolls in cooperation, and by these two rolls the mesh endless belt and smooth surface endless belt are pressed, rolled and squeezed from upper and lower sides, and moisture contained in the wet paper on the mesh endless belt is absorbed on the dewatering roll by way of the mesh endless belt.

25. The used paper processing apparatus of claim 24,
wherein the dewatering roll has a dewatering sheet made of porous material of fine continuous pores wound around the outer circumference of the cylindrical roll of rigid material.

26. The used paper processing apparatus of claim 24,
wherein the press roll is a cylindrical press roll of rigid material.

27. The used paper processing apparatus of claim 12,
wherein a preliminary dewatering roll rolling on the mesh endless belt from the lower side is disposed at the upstream side of the dewatering roll.

28. The used paper processing apparatus of claim 27,
wherein the preliminary dewatering roll has a dewatering sheet made of porous material of fine continuous pores wound around the outer circumference of the cylindrical roll of rigid material.

29. The used paper processing apparatus of claim 1,
wherein a slurry preventive roll for rolling and pressurizing the smooth surface endless belt from the upper side is disposed near the upstream side position of the dewatering roll.

30. The used paper processing apparatus of claim 29,
wherein the slurry preventive roll is a cylindrical roll composed of rigid material.

31. The used paper processing apparatus of claim 1,
wherein a smooth surface finishing roll for rolling and pressuring the wet paper on the smooth surface endless belt is disposed somewhere on the running route of smooth surface endless belt.

32. The used paper processing apparatus of claim 1,
wherein a parting member for parting a dry paper dried on the smooth surface endless belt is disposed at the downstream side of the heating dryer in the smooth endless belt.

33. The used paper processing apparatus of claim 32,
wherein a fixed size cutter for cutting the recycled paper parted from the smooth surface endless belt to a specified length is provided at the downstream side of the parting member.

34. The used paper processing apparatus of claim 1,
wherein in the paper making section, the smooth surface endless belt of the downstream side drying belt conveyor and the mesh endless belt of upstream side paper making net conveyor are laminated and disposed vertically, and
in the upper and lower adjacent portions of the smooth surface endless belt and mesh endless belt, the dewatering roll presses, rolls and squeezes the mesh endless belt and smooth surface endless belt from the upper and lower sides.

35. The used paper processing apparatus of claim 34,
wherein the paper making net conveyor and drying belt conveyor are driven by a common drive source.

36. A used paper processing apparatus comprising:
a pulp manufacturing section for manufacturing used paper pulp by macerating and beating the used paper, and a paper making section for manufacturing recycled paper by making the used paper pulp manufactured in the pulp manufacturing section, which are contained in a furniture size apparatus case,
wherein, being place in a place of origin of used paper, the produced used paper is macerated and processed by the pulp manufacturing section into used paper pulp, the used paper pulp is processed by the paper making section into recycled paper, and thereby the used paper is recycled and used as recycled paper within the place of origin of used paper,
wherein the paper making section includes a paper making net conveyor for making a wet paper from pulp suspension slurry containing water and used paper pulp sent from the pulp manufacturing section, a drying belt conveyor for making recycled paper by drying the wet paper formed by the paper making net conveyor, and a dewatering roll for squeezing and dewatering the wet paper in a combined portion of paper making net conveyor and drying belt conveyor, and
the pulp suspension supplied from the pulp manufacturing section is, processed, dewatered and dried,
wherein the drying belt conveyor includes a smooth surface endless belt having a specified width for receiving and conveying the wet paper processed and formed in the paper making net conveyor, a drive motor for driving this smooth surface endless belt, and a heating dryer for heating and drying the wet paper on the smooth endless belt, and
the wet paper squeezed and dewatered in the paper making net conveyor at downstream position of the dewatering roll is transferred adhered and conveyed to the lower side of the smooth surface endless belt by the smooth surface structure of the smooth surface endless belt.

37. The used paper processing apparatus of claim 36,
wherein the pulp manufacturing section includes agitating means for agitating used paper, and water feed means for supplying water to the agitating means, and
macerated used paper supplied from a supply opening of the apparatus case is agitated in water, and further macerated and beaten.

38. The used paper processing apparatus of claim 36,
wherein the water used in the pulp manufacturing section is wastewater from the paper making section recirculated by water circulation system.

39. The used paper processing apparatus of claim 36,
wherein the drive source of pulp manufacturing section and paper making section is a motor drive source driven by power source for general household.

* * * * *